(12) United States Patent
Friedman et al.

(10) Patent No.: US 8,506,108 B2
(45) Date of Patent: Aug. 13, 2013

(54) POWER TOOL WITH LIGHT FOR ILLUMINATING A WORKPIECE

(75) Inventors: Brian E. Friedman, Baltimore, MD (US); Stephen P. Osborne, Pikesville, MD (US); Eva J. Dixon, Columbia, MD (US); Eric E. Hatfield, Jacobus, PA (US); Daniel Krout, Abingdon, MD (US); Robert Kusmierski, York, PA (US); Corey G. Robertson, Felton, MD (US); Jeffrey Delcamp, Baltimore, MD (US); Daniel Puzio, Baltimore, MD (US); Robert S. Gehret, Hampstead, MD (US); Stuart Garber, Towson, MD (US); Joerg Zellerhoff, Towson, MD (US); Joao Norona, Baltimore, MD (US); Aris Cleanthous, Towson, MD (US); Amanda Miller, Joppa, MD (US)

(73) Assignee: Black & Decker Inc., Newark, DE (US)

(*) Notice: Subject to any disclaimer, the term of this patent is extended or adjusted under 35 U.S.C. 154(b) by 0 days.

(21) Appl. No.: 13/616,610

(22) Filed: Sep. 14, 2012

(65) Prior Publication Data

US 2013/0003358 A1    Jan. 3, 2013

Related U.S. Application Data

(63) Continuation of application No. 12/895,051, filed on Sep. 30, 2010, now Pat. No. 8,317,350, which is a continuation-in-part of application No. 12/379,585, filed on Feb. 25, 2009, now Pat. No. 8,328,381, and a continuation-in-part of application No. 12/859,036, filed on Aug. 18, 2010.

(51) Int. Cl.
 *B25B 23/18* (2006.01)
(52) U.S. Cl.
 USPC .................................. 362/119; 362/192
(58) Field of Classification Search
 USPC ................ 362/109, 119, 120, 192, 193
 See application file for complete search history.

(56) References Cited

U.S. PATENT DOCUMENTS

| | | |
|---|---|---|
| 2,702,649 A | 2/1955 | Neilson |
| 2,730,263 A | 1/1956 | Neilson |
| 2,852,051 A | 9/1958 | Bickner |
| 3,109,238 A | 11/1963 | Marks |
| 3,393,309 A | 7/1968 | Leach et al. |
| 3,499,226 A | 3/1970 | Hopkins |
| 2,806,492 A | 2/1971 | Jugler |
| 3,561,462 A | 2/1971 | Jugler |
| 3,595,132 A | 7/1971 | Thacker |
| 3,603,782 A | 9/1971 | Wortmann |
| 3,656,727 A | 4/1972 | Greenlee |
| 3,681,627 A | 8/1972 | Murry et al. |
| 3,729,658 A | 4/1973 | Voitov |
| 3,977,278 A | 8/1976 | Jackson |
| 3,983,976 A | 10/1976 | Taylor |
| 4,078,869 A | 3/1978 | Honeycutt |
| 4,089,031 A | 5/1978 | Stevens |

(Continued)

*Primary Examiner* — Y My Quach Lee
(74) *Attorney, Agent, or Firm* — Scott B. Markow

(57) ABSTRACT

A power tool having a light for illuminating an area proximate a movable end effector. The light may be mounted in such a way as to transmit light through a rotatable collar on the power tool, through or through a member of a housing of the power tool, or from the moving end effector. The light may be powered by a power source that is used for moving the end effector or from a generator that generates electrical power when the power tool is used.

20 Claims, 29 Drawing Sheets

(56) References Cited

U.S. PATENT DOCUMENTS

| | | |
|---|---|---|
| 4,131,203 A | 12/1978 | Bridges |
| 4,133,507 A | 1/1979 | Chervenak |
| 4,160,570 A | 7/1979 | Bridges |
| 4,246,506 A | 1/1981 | Vartanian et al. |
| 4,399,226 A | 8/1983 | Danielson et al. |
| 4,429,463 A | 2/1984 | Angell |
| 4,480,295 A | 10/1984 | Shuster |
| 4,480,301 A | 10/1984 | Pfaff et al. |
| 4,536,000 A | 8/1985 | Rohn |
| 4,540,318 A | 9/1985 | Hornung et al. |
| 4,611,716 A | 9/1986 | Sorlien |
| 4,648,610 A | 3/1987 | Hegyi |
| 4,678,922 A | 7/1987 | Leininger |
| 4,703,850 A | 11/1987 | Walker |
| 4,809,426 A | 3/1989 | Takeuchi et al. |
| 4,833,782 A | 5/1989 | Smith |
| 4,839,777 A | 6/1989 | Janko et al. |
| 4,899,971 A | 2/1990 | Elkin |
| 4,930,628 A | 6/1990 | Bridges |
| 5,003,434 A | 3/1991 | Gonser et al. |
| 5,133,455 A | 7/1992 | Chow |
| 5,319,527 A | 6/1994 | Murphy et al. |
| 5,543,679 A | 8/1996 | Morino et al. |
| 5,801,454 A | 9/1998 | Leininger |
| 5,818,188 A | 10/1998 | Hirai et al. |
| 5,845,986 A | 12/1998 | Breen |
| 5,924,615 A | 7/1999 | McGarrah |
| 6,095,659 A | 8/2000 | Hsu |
| 6,126,295 A | 10/2000 | Hillinger |
| 6,168,301 B1 | 1/2001 | Martinez et al. |
| 6,178,081 B1 | 1/2001 | Armond et al. |
| 6,183,103 B1 | 2/2001 | Hillinger |
| 6,213,620 B1 | 4/2001 | Huang |
| 6,224,229 B1 | 5/2001 | Lin |
| 6,237,767 B1 | 5/2001 | Lee |
| 6,238,058 B1 | 5/2001 | Lin |
| 6,243,240 B1 | 6/2001 | Ozue et al. |
| 6,260,979 B1 | 7/2001 | Lin |
| 6,283,607 B1 | 9/2001 | Lin |
| 6,318,874 B1 | 11/2001 | Matsunaga |
| 6,322,177 B1 | 11/2001 | Vasudeva |
| 6,401,996 B1 | 6/2002 | Thom et al. |
| 6,454,429 B1 | 9/2002 | Liao |
| 6,467,577 B1 | 10/2002 | Charlebois, Jr. |
| 6,478,442 B2 | 11/2002 | Chen |
| 6,497,494 B1 | 12/2002 | Lin |
| 6,501,199 B2 | 12/2002 | Hung |
| 6,511,201 B1 | 1/2003 | Elrod |
| 6,694,631 B2 | 2/2004 | Bone et al. |
| 6,803,683 B2 | 10/2004 | Bone et al. |
| 6,810,596 B2 | 11/2004 | Fung et al. |
| 6,822,357 B2 | 11/2004 | Hung |
| 6,857,756 B2 | 2/2005 | Reiff et al. |
| 6,863,544 B2 | 3/2005 | Haehn et al. |
| 6,868,967 B2 | 3/2005 | Lam |
| 6,905,015 B2 | 6/2005 | Hernandez, Jr. et al. |
| 6,921,235 B2 | 7/2005 | Chen |
| 6,991,105 B2 | 1/2006 | Winnard |
| 7,025,485 B2 | 4/2006 | Henry |
| 7,029,142 B2 | 4/2006 | Chen et al. |
| 7,054,411 B2 | 5/2006 | Katcha et al. |
| 7,069,662 B2 | 7/2006 | Fung et al. |
| 7,197,113 B1 | 3/2007 | Katcha et al. |
| 7,200,516 B1 | 4/2007 | Cowley |
| 7,228,983 B2 | 6/2007 | Pangerc et al. |
| 7,258,230 B2 | 8/2007 | Hernandez, Jr. et al. |
| 7,296,905 B2 | 11/2007 | Etter et al. |
| 7,303,007 B2 | 12/2007 | Konschuh et al. |
| 7,307,230 B2 | 12/2007 | Chen |
| 7,395,876 B1 | 7/2008 | Walker |
| 7,404,696 B2 | 7/2008 | Campbell |
| 7,559,427 B2 | 7/2009 | Hu |
| 7,654,178 B2 | 2/2010 | Hall et al. |
| 7,682,036 B2 | 3/2010 | Reiff et al. |
| 7,705,482 B2 | 4/2010 | Leininger |
| 7,717,619 B2 | 5/2010 | Katcha et al. |
| 7,728,464 B2 | 6/2010 | Leininger |
| 7,815,356 B2 | 10/2010 | Lutz et al. |
| 7,824,136 B2 | 11/2010 | Campbell |
| 7,850,325 B2 | 12/2010 | Wall et al. |
| 7,866,839 B2 | 1/2011 | Chien |
| 7,934,847 B2 | 5/2011 | Oomori et al. |
| 8,016,048 B2 | 9/2011 | Ueda et al. |
| 8,042,966 B2 | 10/2011 | Lutz et al. |
| 8,075,155 B2 | 12/2011 | Watanabe et al. |
| 2002/0179437 A1 | 12/2002 | Ko |
| 2003/0042803 A1* | 3/2003 | Hirschburger et al. ....... 362/192 |
| 2004/0084342 A1 | 5/2004 | Chang |
| 2005/0199522 A1 | 9/2005 | Hu |
| 2005/0218023 A1 | 10/2005 | Winnard |
| 2005/0221664 A1 | 10/2005 | Winnard |
| 2005/0247585 A1 | 11/2005 | Breckwoldt et al. |
| 2006/0104085 A1 | 5/2006 | Walker et al. |
| 2006/0104732 A1 | 5/2006 | Huang |
| 2006/0234846 A1 | 10/2006 | Tucker |
| 2006/0243105 A1 | 11/2006 | Delfini et al. |
| 2006/0250057 A1 | 11/2006 | Vasudeva |
| 2006/0262519 A1 | 11/2006 | Hirschburger et al. |
| 2006/0289595 A1 | 12/2006 | Shen et al. |
| 2007/0046110 A1 | 3/2007 | Liu |
| 2008/0041746 A1 | 2/2008 | Hsiao |
| 2008/0068827 A1 | 3/2008 | Chang |
| 2008/0149678 A1 | 6/2008 | Huang |
| 2008/0244910 A1 | 10/2008 | Patel |
| 2008/0314795 A1 | 12/2008 | Lin |
| 2009/0077814 A1 | 3/2009 | Gibbons et al. |
| 2009/0077816 A1 | 3/2009 | Gibbons et al. |
| 2009/0077817 A1 | 3/2009 | Gibbons et al. |
| 2009/0077819 A1 | 3/2009 | Kuehne et al. |
| 2009/0123817 A1 | 5/2009 | Stickel et al. |
| 2009/0134710 A1 | 5/2009 | Tyndall et al. |
| 2009/0159677 A1 | 6/2009 | Yakimov et al. |
| 2009/0313831 A1 | 12/2009 | Patel |
| 2010/0000094 A1 | 1/2010 | Lombardo |
| 2010/0002415 A1 | 1/2010 | Munn et al. |
| 2010/0043603 A1 | 2/2010 | McRoberts et al. |
| 2010/0089601 A1 | 4/2010 | Fukinuki et al. |
| 2010/0148505 A1 | 6/2010 | Dunlap et al. |
| 2010/0214768 A1 | 8/2010 | Dixon et al. |
| 2010/0242695 A1 | 9/2010 | Xu et al. |
| 2010/0277897 A1 | 11/2010 | Hecht et al. |
| 2010/0315804 A1 | 12/2010 | Nishikimi et al. |
| 2010/0328969 A1 | 12/2010 | Meyer |
| 2011/0017473 A1 | 1/2011 | Clarkson et al. |
| 2011/0170312 A1 | 7/2011 | Parrinello |
| 2011/0197458 A1 | 8/2011 | Karrar et al. |

* cited by examiner

POWER TOOL WITH LIGHT FOR ILLUMINATING A WORKPIECE

CROSS-REFERENCE TO RELATED APPLICATIONS

This is a continuation of U.S. Ser. No. 12/895,051, filed Sep. 30, 2012, which is a continuation-in-part of U.S. Ser. No. 12/379,585 filed Feb. 25, 2009, and a continuation-in-part of U.S. Ser. No. 12/859,036 filed Aug. 18, 2010. The disclosures of each the aforementioned applications are incorporated by reference as if fully set forth in detail herein.

FIELD

The present disclosure relates to a power tool with a light for illuminating a workpiece.

BACKGROUND

This section provides background information related to the present disclosure which is not necessarily prior art.

Power tools are often used in a variety of conditions ranging from well-lit indoor work spaces to outside construction sites or other areas that are not always well-lit. Accordingly, it is desirable to provide a method or apparatus that permits a power tool to have a lighting feature that will illuminate the workpiece that is being machined or worked on by the power tool. Such a lighting feature will assist a user to be able to adequately see the workpiece or work area that is being worked on or machined by the power tool even in substandard light conditions.

Because power tools may be used in adverse environmental conditions, it is desirable to protect such a lighting feature from the adverse environmental conditions.

SUMMARY

This section provides a general summary of the disclosure, and is not a comprehensive disclosure of its full scope or all of its features.

In one form, the present disclosure provides a power tool that includes a housing assembly, an output spindle, first and second bearings, a motor, a transmission and a light system. The housing assembly has a housing structure and a case that is coupled to the housing structure. The case includes a first case member and a second case member. The output spindle is at least partially received in the case. The first bearing is mounted to the first case member and is configured to support a first axial end of the output spindle. The second bearing is mounted to the second case member and is configured to support a second, opposite axial end of the output spindle. The motor is housed in the housing assembly and provides a source of rotary power. The transmission is housed in the housing assembly and drivingly couples the motor to the output spindle. The light system includes a light ring and a circuit assembly. The circuit assembly includes a light emitting element and is received in the light ring. The light ring is received axially between the first and second case members.

In another form, the present disclosure provides a power tool that includes an output spindle, a motor that provides a source of rotary power, a transmission drivingly coupling the motor to the output spindle, an end effector coupled to the output spindle for movement therewith, a housing into which the output spindle, the motor and the transmission are received, a generator and a light coupled to the generator for receipt of electrical power therefrom. The generator includes a field winding and a set of magnets. The field winding is coupled for rotation with a first one of an output shaft of the motor, a first rotating component of or driven by the transmission, a second rotating component of or driven by the transmission, the output spindle and the end effector such that the field winding rotates at a first rotational speed when the motor is operating. The set of magnets is coupled for rotation with a second, different one of the output shaft of the motor, the first rotating component of or driven by the transmission, the second rotating component of or driven by the transmission, the output spindle and the end effector such that the set of magnets rotates at a second rotational speed when the motor is operating. The second rotational speed is different from the first rotational speed such that an electric current is produced in the field winding.

Optionally, the power tool can be further characterized by one or more of the following:

the field winding can be mounted on the first rotating component, the set of magnets can be mounted on the second rotating component, and the first and second rotating components can be planet carriers in adjacent stages of the transmission;

the set of magnets can be mounted on the first rotating component and the field winding can be mounted on the output spindle;

the first rotating component can be a sun gear;

one of the field winding and the set of magnets can be mounted on a drive shaft that is directly coupled to the output shaft of the motor and the field winding can be located within the end effector;

one of the field winding and the set of magnets can be mounted on a drive shaft that is directly coupled the first component and the field winding can be located within the end effector;

the field winding can be received coaxially within the set of magnets; the set of magnets can be received within the field winding and the set of magnets can include a plurality of magnets that are spaced axially apart along a rotational axis about which the set of magnets rotate; and the power tool can include an energy storage device that is electrically coupled to the generator and the light, the energy storage device can be a capacitor, and the energy storage device can be housed in the end effector.

In still another form, the present disclosure provides a power tool that includes an output spindle, a motor providing a source of rotary power, a transmission drivingly coupling the motor to the output spindle, an end effector coupled to the output spindle for movement therewith, a housing into which the output spindle, the motor and the transmission are received, and a light system that includes a first portion and a second portion. The first portion is coupled to the housing and includes a pair of first terminals that are configured to be coupled to a source of electric power. The second portion is mounted to the end effector for common rotation about an axis. The second portion includes a connector and a circuit assembly. The connector includes a pair of second terminals that are configured to engage the pair of first terminals to conduct electricity between the first and second portions. The circuit assembly includes a light element that is electrically coupled to the pair of second terminals.

Optionally, the power tool can be further characterized by one or more of the following:

the light system further includes a transparent cover that is mounted to the end effector on a side of the circuit assembly opposite the connector;

the cover includes an optic element, the optic element being configured to either spread light generated by the light emitting element or focus light generated by the light emitting element;

the end effector is a chuck; and one of the pair of first terminals and the pair of second terminals includes annular conductive members disposed concentrically about the axis.

In accordance with one embodiment of the present invention, a power tool is provided. The power tool includes a housing, an end effector rotatable with respect to the housing, a collar rotatable with respect to the housing, a printed circuit board (PCB) rotatably fixed with respect to the housing, and a lighting element operatively connected to the PCB and adjacent to the end effector and in a recess of the collar and located to illuminate a workpiece machined by the power tool.

In accordance with another embodiment of the present invention, a power tool is provided. The power tool includes a rotatable end effector, a rotatable collar, a printed circuit board (PCB), lighting elements operatively connected to the PCB and adjacent to the end effector and located to illuminate a workpiece machined by the power tool, and a guide supporting the PCB and wires configured to provide power to the PCB for illuminating the lighting elements, wherein the PCB and a portion of the guide are generally circular in shape, the lighting elements are annularly arranged on the PCB and portion of the end effector extends through a hole in the defined by the guide and PCB and the guide defines a groove and the PCB is located in the groove.

In accordance with yet another embodiment of the present invention, a method of providing light for a workpiece being machined by a power tool is provided. The method includes locating lighting elements around a spindle of a power tool, aligning the lighting elements to shine light on a workpiece being machined by the power tool, operatively connecting the lighting elements to a PCB, containing and supporting the PCB with a guide, supporting wires configured to provide power to the PCB with the guide, locating the lighting elements, PCB and guide in a rotatable collar, and preventing the lighting elements, PCB and guide from rotating when the collar rotates.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
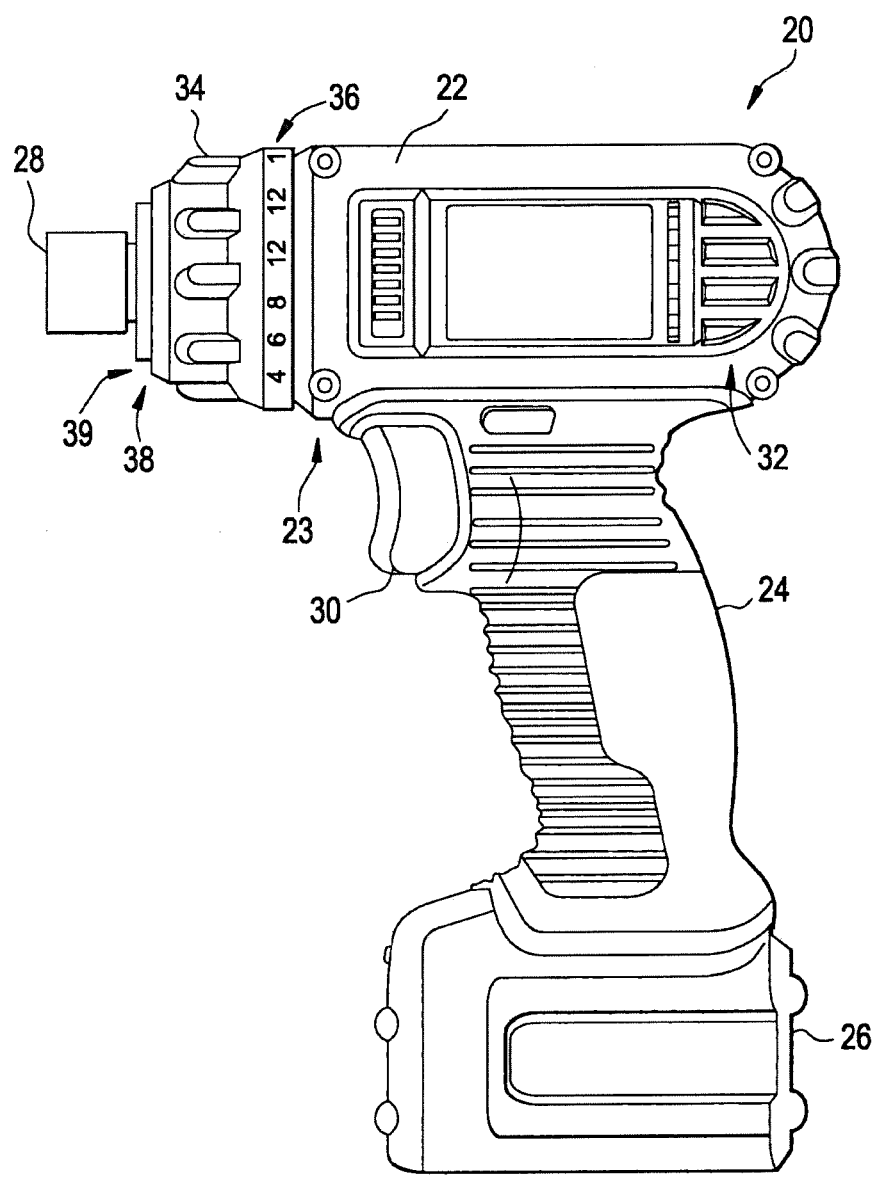
FIG. 1 is a side view illustrating a power tool in accordance with an embodiment of the invention.

The invention will now be described with reference to the drawing figures, in which like reference numerals refer to like parts throughout. An embodiment in accordance with the present invention provides a power tool having a light ring configured to shine light onto a workpiece being operated upon by the power tool.

According to some embodiments of the invention, light emitting elements, such as light emitting diodes (LEDs), are placed in an annular or ring shape around part of the end effector and are configured to shine forward to illuminate the tool or accessory held by the end effector and the workpiece being machined by the tool. The end effector may be a tool or accessory holder mounted to an output spindle of the tool. Examples of end effectors that may be used in accordance with the invention may be the 7000 Series chuck manufactured and marketed by the Jacobs Chuck Manufacturing Company of Clemson, S.C. and quick change chucks and bit holders similar to those which are found on products such as a DC825KA Impact Driver and the driver that is disclosed in U.S. application Ser. No. 12/394,426 (the disclosure of which is incorporated by reference as if fully set forth in detail herein) and a DC815KA Impact Driver that are manufactured and marketed by the DeWalt Industrial Tool Company of Baltimore, Md.

While several different types of lighting elements can be used in accordance with the invention, such as light bulbs (for example, xenon bulbs) or other lighting elements, LED lights are discussed here as an example and do not limit embodiments in accordance with the invention to tools using LEDs. The LED lights, or other lighting elements, and associated parts are locked to the housing of the tool and do not rotate when the power tool is operated. The lights may be powered by the same power source that provides power to the power tool's motor. In the case of most cordless power tools, it is a battery that powers the power tool and in the case of corded tools it is AC current provided from source voltage through a cord. This AC current may be modified according to the needs of the lighting device being employed. In the case of LED lights, a rectifier may be employed to convert AC current to DC.

An embodiment in accordance with the invention is illustrated in FIG. 1. FIG. 1 shows a power driver 20. The power driver 20 has a housing 22. The housing may be of a clam shell type or any other suitable type housing. The power driver 20 may have a nose cone 23 located at the front portion of the power driver 20. A handle 24 projects downwardly from the housing 22 and is terminated with a battery 26. The battery 26 provides the power to turn the end effector 28.

The end effector 28 may be configured to hold an accessory or tool such as a drill bit or a driving type accessory such as a Philips or standard screwdriver. Other types of tools or accessories may be held and used in the end effector 28 as can appreciated by one skilled in the art. The movement of the end effector 28 may be controlled by the trigger 30. The trigger 30 may selectively provide power from the battery 26 to the motor 32 located within the housing 22. In some embodiments of the invention, the more the trigger or switch 30 is depressed the more power may be applied to the motor 32 which may cause the end effector 28 to spin faster.

The power driver 20 may be equipped with a clutch collar 34. Other embodiments in accordance with the invention may not have a rotating clutch collar, but rather a different rotating collar mechanism. The rotating collar mechanism may be a drill/hammer mode selector, a gear shifter, an on/off switch, a tool variable speed control or other rotating collar control mechanism. However, this specification will refer to a clutch collar as an example but does not limit embodiments in accordance with the invention to tools having clutch collars. The clutch collar 34 can provide protection for interior portions of the power driver 20, particularly the transmission and other internal components of the power driver 20 that may be mounted on the nose cone 23. The clutch collar 34 may be rotated to adjust the transmission. An example of a clutch and transmission that may work in accordance with the invention is shown in U.S. Pat. No. 7,066,691 which is incorporated by reference in its entirety. Of course, most any type of clutch and transmission may be used in accordance with the invention. Different angular positions of the clutch collar 34 may provide different amounts of torque and/or speed to the end effector 28 for a given trigger 30 position. A numbered scale 36 may appear on the clutch collar 34 in order to provide a user an indication of the setting of the clutch collar 34. In some embodiments the user may turn the clutch collar 34 to a desired position by hand.

A light ring 38 is located on a front portion of the power tool 20 just behind the end effector 28 in a recess 39 in the clutch collar 34.

Figure 2:
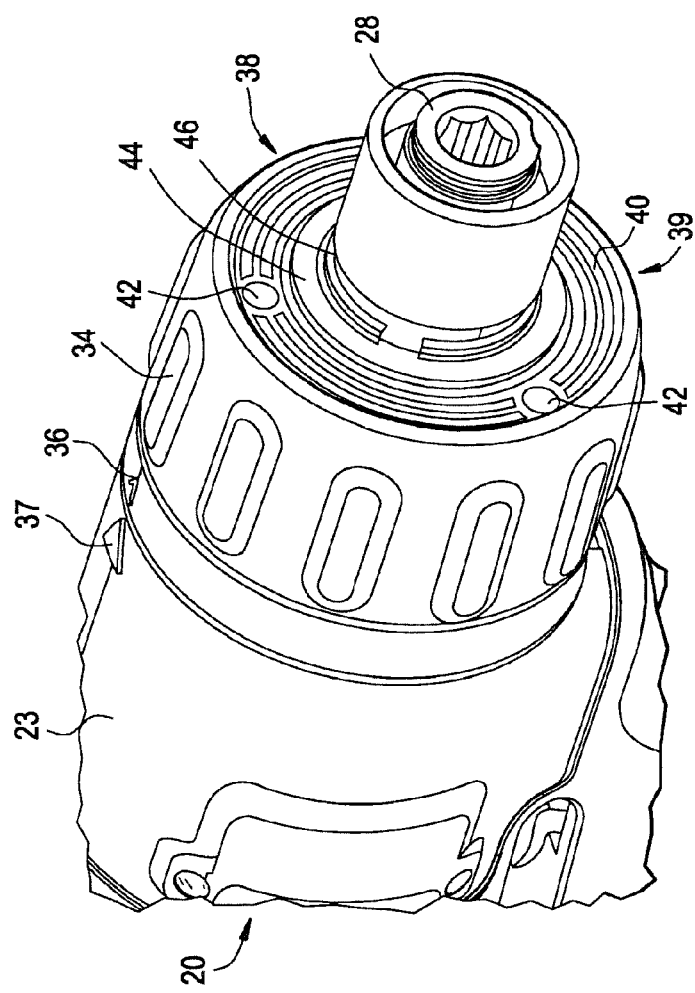
FIG. 2 is a perspective view illustrating a front portion of a power tool in accordance with an embodiment of the invention.
Figure 5:
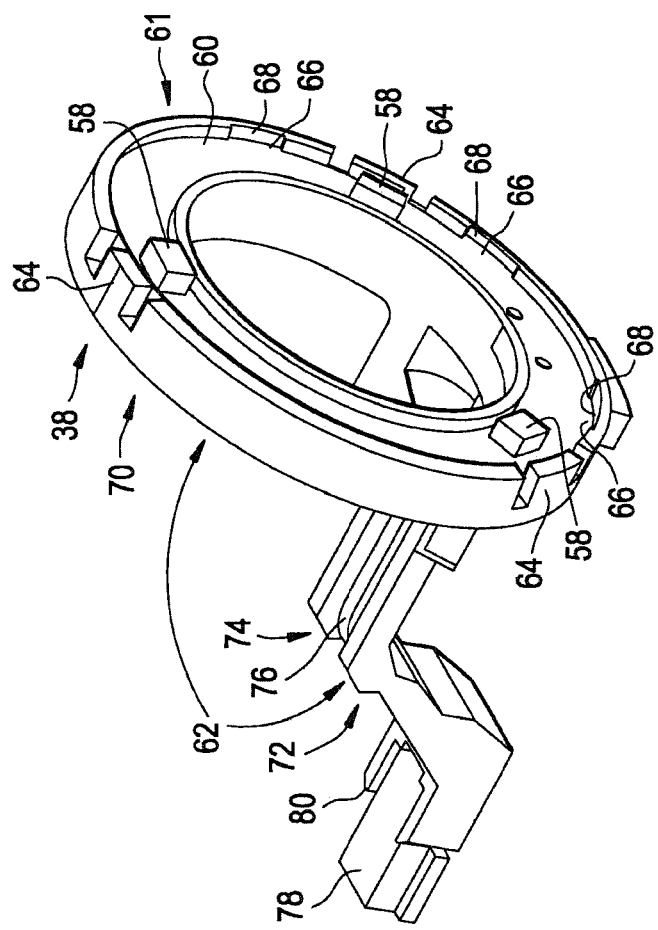
FIG. 5 is a perspective view of a wire guide and printed circuit board (PCB) having light emitting diode (LED) elements.

In FIG. 2, a partial perspective view of a front portion of the power driver 20 is shown. An indicator 37 may be located on the nose cone 23. The indicator 37 may provide a reference for the user for determining the angular position of the clutch collar 34 and a reference point for comparing the numbers on the numbered scale 36. The light ring 38 is located within a recess 39 of the clutch collar 34. The light ring 38 may include a cover 40. The cover 40 may protect interior components of the tool from moisture or other contaminants. The cover 40 may include blisters 42 located on the cover 40 as to be directly over the LEDs 58 (as shown in FIG. 5). The blisters 42 may be translucent or clear in order to permit light generated by the LEDs 58 to pass through. In some embodiments the blisters 42 may direct or focus the light. The blisters 42 may be round, rectangular, square or any other shape. In some embodiments the blisters 42 are shaped to correspond with the shape of the lighting elements 58. In other embodiments the light may simply pass through the blisters 42. The remainder of the cover 40 may be a dark color. Other color schemes may be used in accordance with the invention.

The cover 40 is held axially in place from moving in a forward direction toward the end effector 28 by retaining ring 44. The retaining ring 44 is mounted on a retainer 46 which is part of the nose cone 37 as better illustrated in FIGS. 13 and 14 and described in more detail later below.

Figure 3:
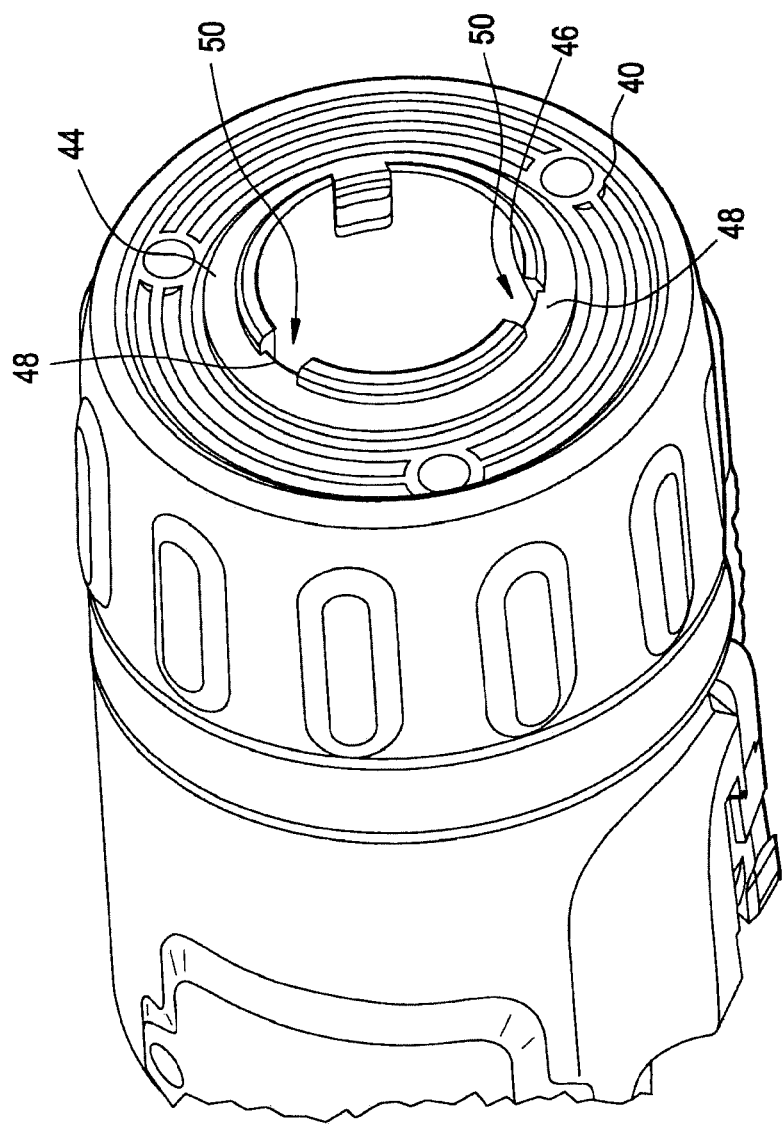
FIG. 3 is a perspective close-up view of the power tool of FIG. 2 with the end effector removed in order to more distinctly show surrounding elements.

FIG. 3 is a similar view to that shown in FIG. 2, however, the end effector 28 is removed to better illustrate certain features associated with the retaining ring 44 and the retainer 46. FIG. 3 shows portions 48 of the retaining ring 44 exposed in gap 50 that would fit within the groove 52 if it were not in the gap 50. The retaining ring 44 fits within a groove 52 in the retainer 46. When the retaining ring 44 is placed in the groove 52 the retaining ring 44 is secured in place. The retaining ring 44 prevents the cover 40 from axially moving forward toward the end effector 28.

Figure 4:
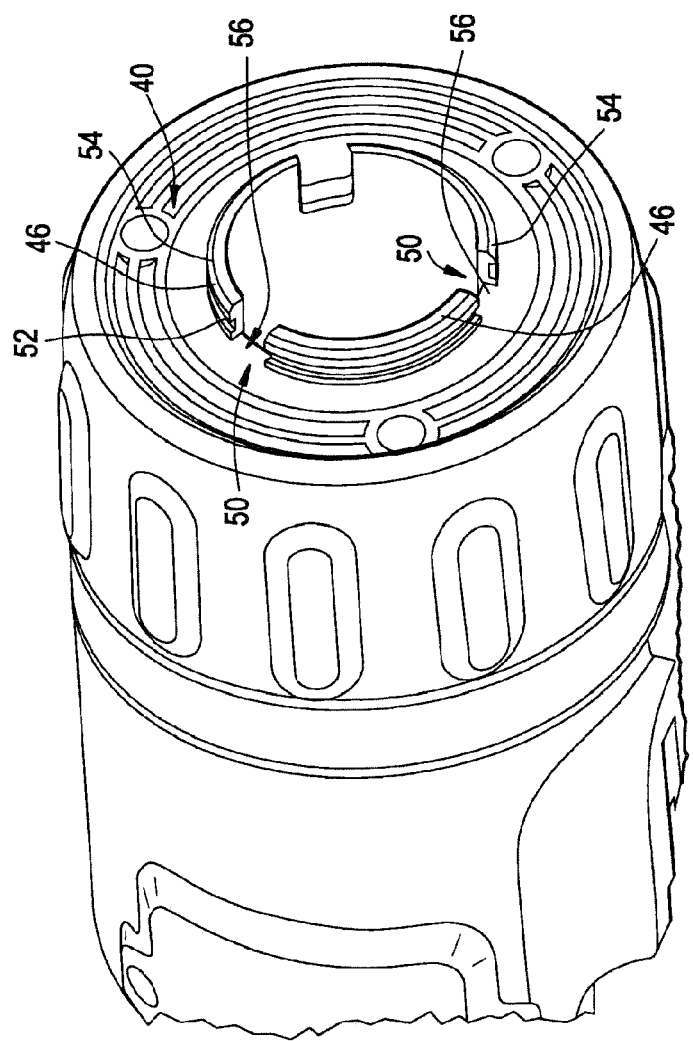
FIG. 4 is a perspective view similar to that shown in FIG. 3 with a retaining ring removed in order to more clearly show surrounding elements.

FIG. 4 is a similar view as that shown in FIG. 3, however, the retaining ring 44 has been removed as well as the end effector 28 to better illustrate features of the cover 40 and the retainer 46. The cover 40 includes tabs 56, which are located within the gaps 50 of the retainer 46. The tab 56 and gap 50 combination keep the cover 40 aligned and from rotating around the retainer 46. The groove 52 is also illustrated in FIG. 4 in which the retaining ring 44 is located as shown in FIG. 3.

FIG. 5 illustrates other aspects of the light ring 38, which are normally contained within the clutch collar 34 and located behind the cover 40. As part of the light ring 38, light emitting diodes or LEDs 58 are located at various points around the light ring 38. In some embodiments in accordance with the invention, the LEDs 58 emit white light although in other embodiments the LEDs 58 might emit other colors of light. In some embodiments different LEDs on the same tool could emit different colors of light. While the embodiment shown in FIG. 5 illustrates three LEDs 58 any number of LEDs may be used in accordance with the invention including one or more.

The LEDs 58 are mounted to a ring-shaped printed circuit board or PCB 60. The PCB 60 and LEDs 58 are fit into a trench 61 in the wire way 62. The wire way 62 and trench 61 may allow for potting of the PCB if necessary. The wire way 62 provides protection and structural strength for the PCB so that undue mechanical loads are not placed upon the PCB 60. Such support is desirable as a PCB 60 may be fragile and subject to breaking or malfunctioning. The wire way 62 may include snap-in features 64 which allow the PCB 60 to be pushed into the wire way 62 and then the snap-in features 64 snap out once the PCB 60 is located within the wire way 62. The snap-in features 64 prevent the PCB 60 from coming out of the wire way 62.

The wire way 62 may include grooves 66. Tabs 68 located on the PCB 62 may fit within the grooves 66 within the wire way 62. The tabs 68 and grooves 66 combination help the PCB 60 and the wire way 62 be aligned and may prevent or resist the PCB 60 from rotating with respect to the wire way 62.

The wire way 62 may include a PCB holding portion 70 which is generally circular in shape and a wire supporting portion 72. The wire supporting portion 72 may include a channel 74 which is sized and located to contain wires 76. The wires 76 may provide power to the PCB 60 which in turns provides power to illuminate the LEDs 58. The wire supporting portion 72 of the wire way 62 provides a structure for the wires 76 to be supported in and provides protection for the wires 76. The wires 76 may terminate with a plug 78. The plug 78 may fit into plug supporting structure 80 located within the wire supporting portion 72 so that the plug 78, which is made of a more rigid material than the wires 76, is held securely to the wire way 62 via the plug supporting structure 80. In some embodiments, the plug 78 may be press fit into the wire supporting portion 72 of the wire way 62. The circuit to which the PCB 60 is connected may also include an electromagnetic surge suppression circuit (such as a zener diode) for static and over-voltage protection. The circuit may also include a resistor or resistors to drop the voltage from the battery pack voltage to an appropriate level for the LEDs.

Some embodiments do not have a separate PCB, wire guide, wires and connector. For example, plated plastics can be used whereby the wire guide could be first molded into a shape similar to the wire guide 62 as shown. Secondly, tracks (like on a standard PCB) could be created on this plastic piece, and could include all of the pads to mount LEDs and other components, the tracks, or "wires," from the front of the tool back to the connector area, and could even include the male end of the connector. The components (diodes, resistors, etc.) could then be soldered to this one piece, and would be electrically connected back to the place where the wires would connect it to the switch. This would greatly simplify the assembly.

Figure 6:
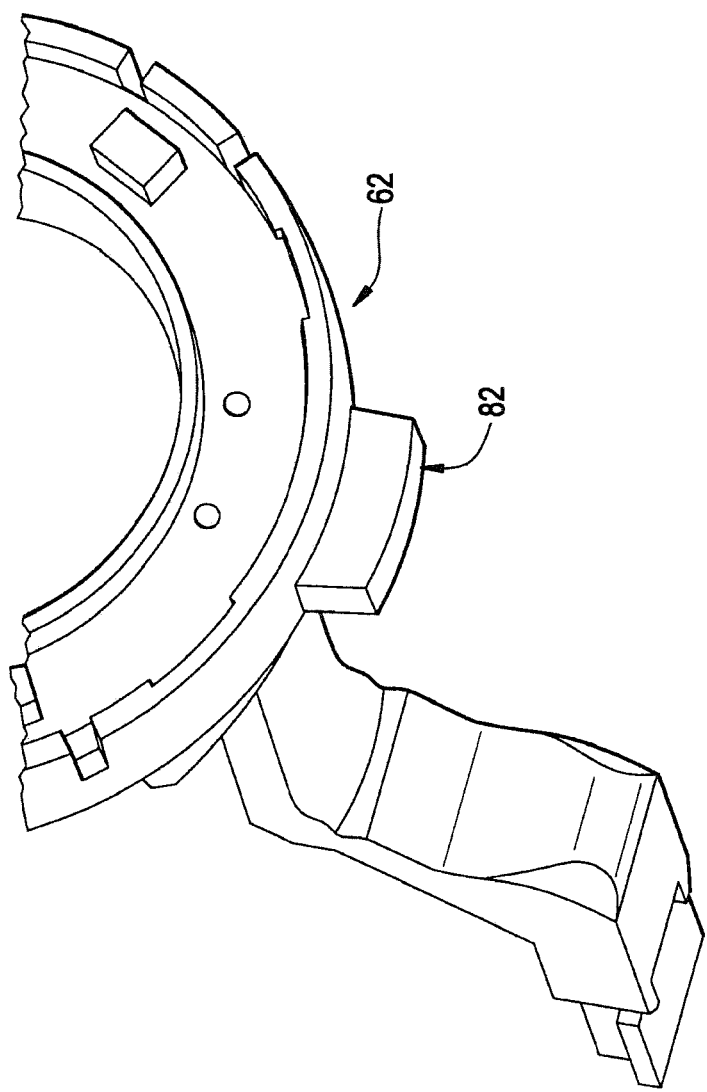
FIG. 6 is a partial perspective view of a bottom portion of the wire guide and PCB.
Figure 12:
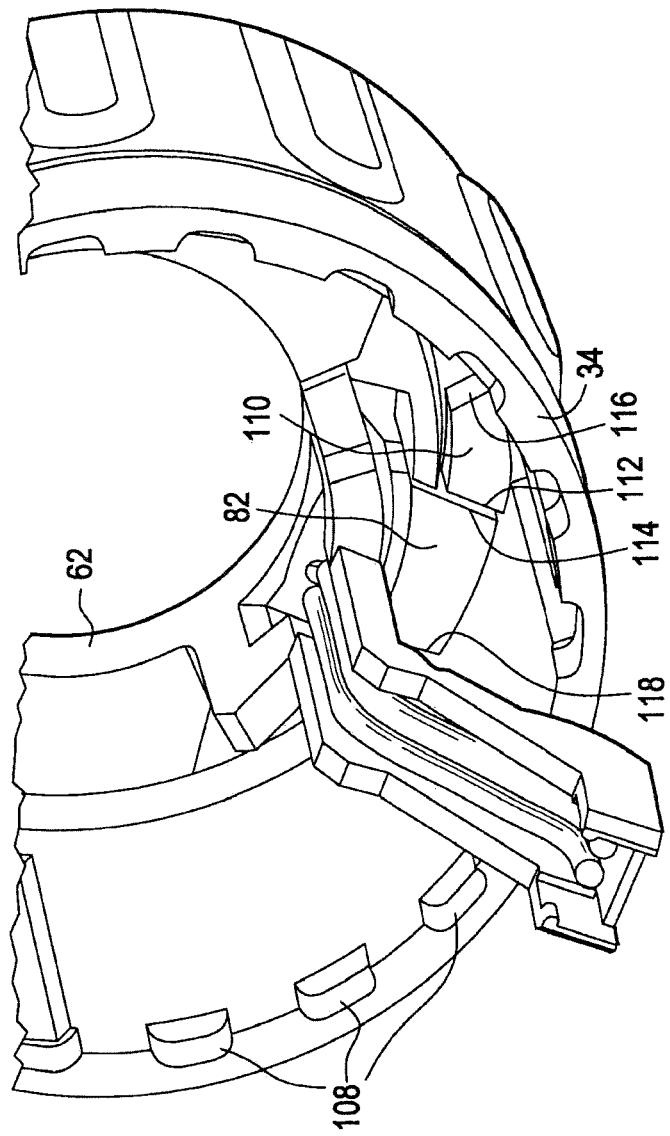
FIG. 12 is a partial rear perspective view of the wire guide mounted on the clutch collar.

FIG. 6 is a partial perspective view of a bottom portion of the wire way 62. The wire way 62 may be equipped with a collar stopping tab 82 which will be explained in more detail below as FIG. 12 is discussed.

Figure 7:
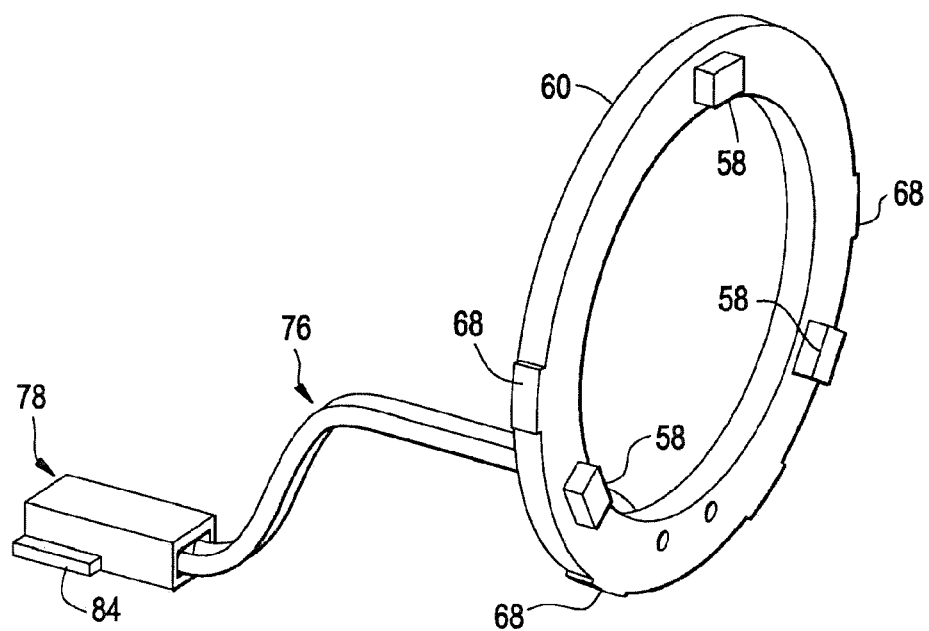
FIG. 7 is a perspective view of the PCB and wires with the wire guide removed.

FIG. 7 is a perspective view similar to that shown in FIG. 5, however, the wire way 62 has been removed in order to better illustrate some of the features shown in FIG. 7. The LEDs 58 are mounted onto the PCB 60. The PCB 60 shows the tabs 68. While the embodiments shown in the figures show five tabs 68, one skilled in the art can appreciate that other numbers of tabs or other features may be employed in order to help keep the PCB aligned and/or rotationally locked to the wire way 68.

The wires 76 are attached to a rear portion of the PCB 60. The plug 78 includes the plug stopping structure 84 which butts against a portion of the wire way 68 to prevent the plug 78 from being inserted too far into the wire way 62.

Figure 8:
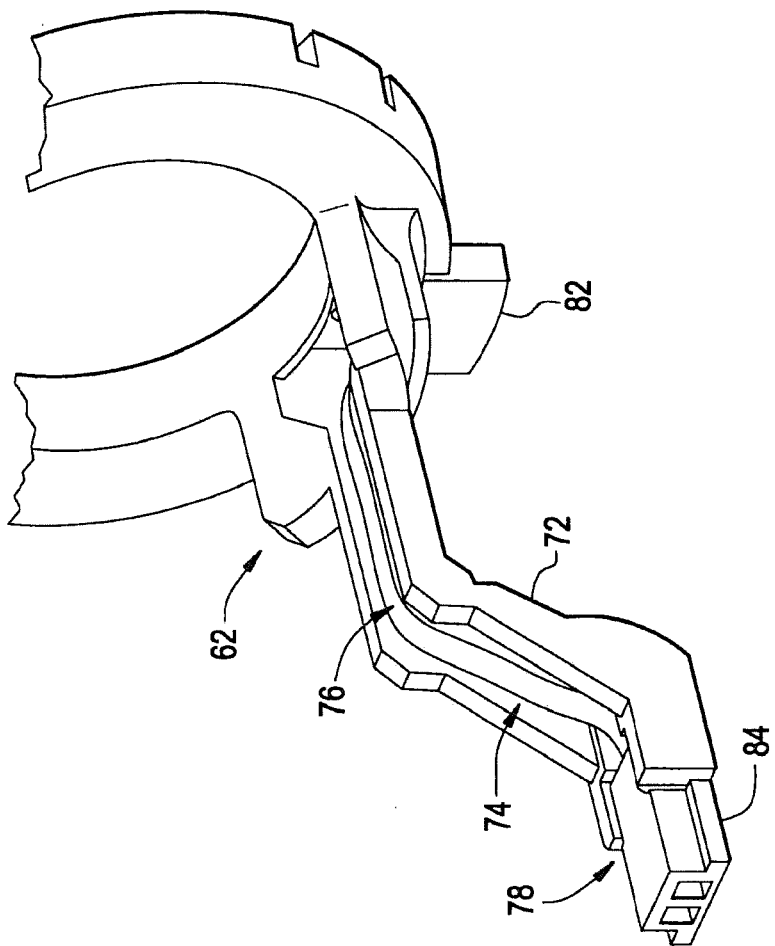
FIG. 8 is a partial perspective rear view of the wire guide, PCB, and wires.

FIG. 8 illustrates the plug stopping structure 84 located on the plug 78 butted against the wire supporting portion 72 of the wire way 62. The wires 76 are located within the channel 74. In some embodiments, the plug 78 snaps into the wire supporting portion 72 and the wires 76 may be pressed into the channel 74 in a press fit manner to secure the wires 76 into the channel 74. A rear portion of the collar stopping tab 82 is also illustrated in FIG. 8.

Figure 9:
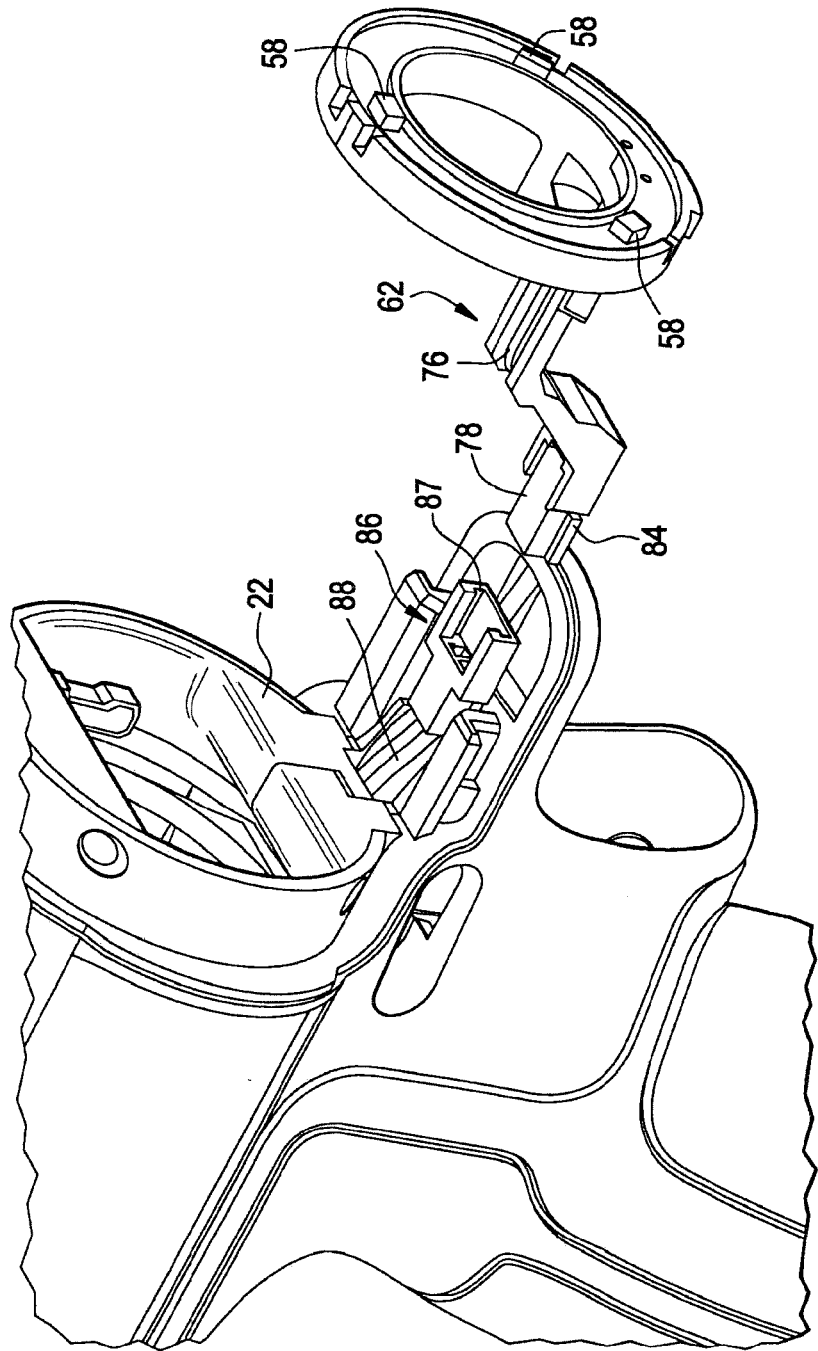
FIG. 9 is a partial exploded perspective view of the wire guide and a power tool having some elements removed to better show other elements.

FIG. 9 illustrates the housing 22 and the wire way 62. The nose cone 23 has been removed in order to better illustrate how the plug 78 attaches to a receiving plug 86. The plug 78 is slid into the receiving plug 76. The plug stopping structure 84 slides into slots 87 located on the receiving plug 86. Once the plug 78 and the receiving plug 86 have been mated together, power from the wires 88 is communicated to the wire 76. The joint made of the plug 78 and the receiving plug 86 provide a rigid support for the connection of the wires 76 and 88. The wires 88 may receive power from the battery 26 as controlled by the trigger 30. In some embodiments the wires 88 extend out of a switch body associated with the trigger 30. In other embodiments, a switch body could have connectors to which the wires 88 are soldered or otherwise connected. The trigger switch may include electronics for variable speed control. The wires 88 may be soldered to a PCB located inside the switch body.

In accordance with some embodiments of the invention, when the trigger 30, as shown in FIG. 1, is depressed, power is sent to the wires 88 and in turn 76 to illuminate the LEDs.

Figure 10:
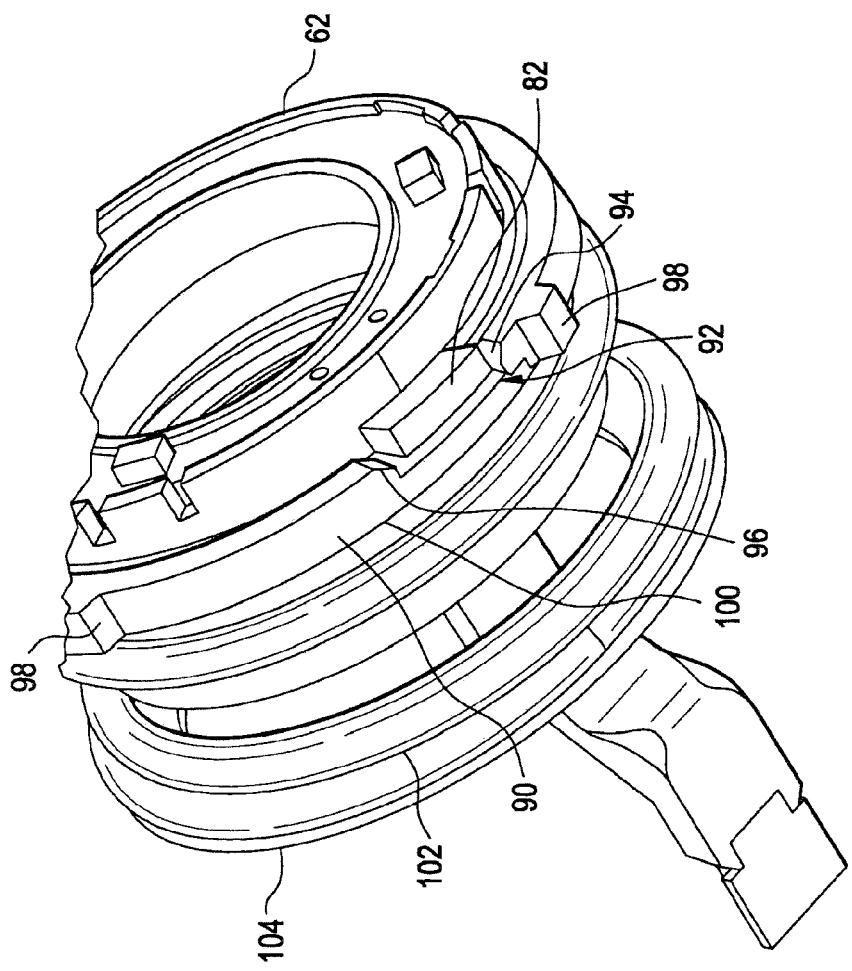
FIG. 10 is a partial perspective view of a wire guide, clutch adjusting nut, clutch spring, and clutch washer mounted on the wire guide.

FIG. 10 is a partial perspective view of the guide 62 showing several additional elements on the guide 62. A clutch adjusting nut 90 is butted against the guide 62. The stop tab 82 is fit into a notch 92 in the clutch adjusting nut 90. The notch 92 in the clutch adjusting nut 90 aligns to the stopping tab 82 on the guide 62 to assist in providing proper assembly of the threads between the adjusting nut 90 and the nose cone 23 during assembly. In some embodiments and as shown in FIG. 10, the notch 92 and the clutch adjusting nut 90 may have chamfered edges 96 to the notch walls 94. The chamfered edges 96 may assist in the stopping tab 82 to be seated in the notch 92 and the clutch adjusting nut 90.

According to some embodiments, a combination of the notch 92 and the clutch adjusting nut 70 and the stopping tab 82 in combination with the other tabs and notch combinations 50, 56, 66, 68 can assure that the cover 40, the nose cone 23, the wire way 62, the PCB 60, and the clutch adjusting nut 90 are aligned with respect to each other.

Figure 11:
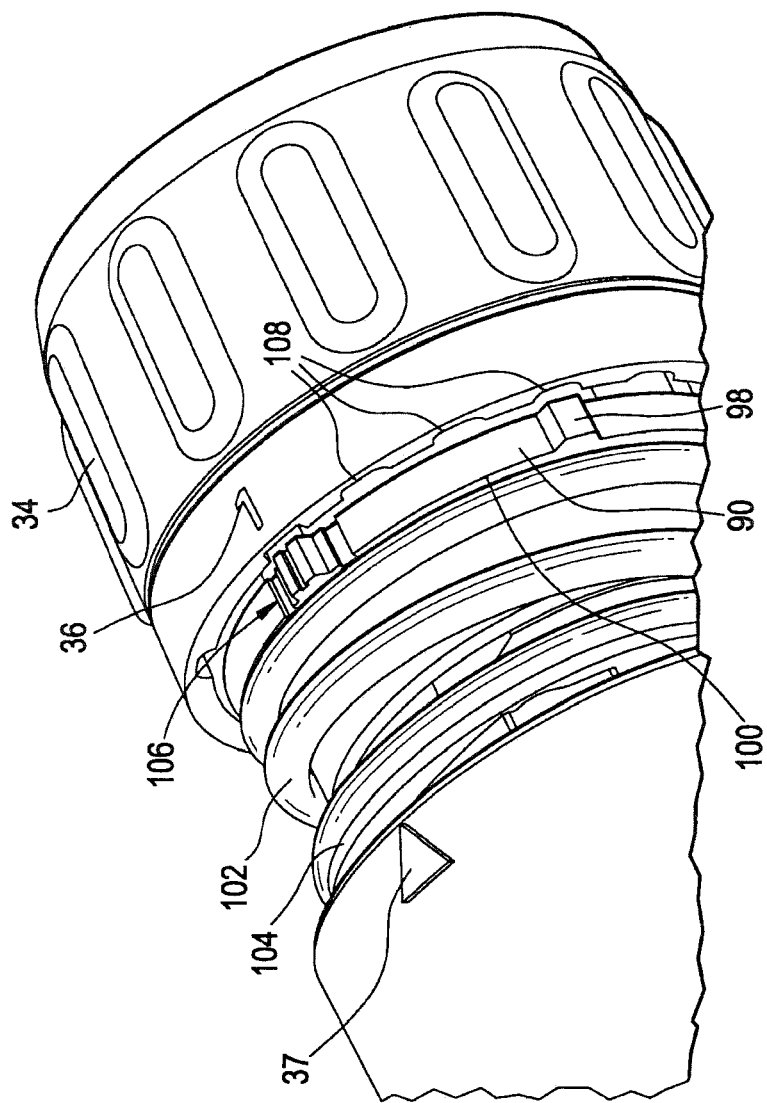
FIG. 11 is a partial perspective view of a power tool and clutch collar where the clutch collar is shown in a forward position to illustrate the clutch adjusting nut, clutch spring, and clutch washer mounted to the nose cone.

The clutch adjusting nut 90 includes a ridge 100. As shown in FIG. 10 a clutch spring 102 urges at one end against the ridge 100 and at the opposite end of the clutch spring 102, the clutch spring 102 urges against a clutch washer 104. The clutch spring 102 exerts a force on the ridge 100 of the clutch adjusting nut 90 which in turn urges the wire way 62 against the cover 40 and ultimately against the retaining ring 44. The force exerted by the clutch spring 102 keeps the light ring assembly 38 in axial position. As shown in FIG. 11 the clutch washer 104 urges against the nose cone 23.

FIG. 11 illustrates the clutch washer 104, clutch spring 102, and the clutch adjusting nut 90 mounted to the nose cone 23. The clutch collar 34 is shown in a forward axial position and not yet installed on the power tool 20 in order to expose the clutch washer 104, the clutch spring 102 and the clutch adjusting nut 90.

To provide ease in the assembly of the power tool 20, a tab 98 on the clutch adjusting nut 90 is scored with marks or notches 106 on one of the adjustment tabs 98. The scoring 106 provides a visual aid when assembling the collar 34 to properly align the clutch collar 34. The adjustment tab 98 on the clutch adjusting nut 90 is aligned with a desired notch 108 in the clutch collar 34. Once the desired notch 108 is aligned with the desired adjustment tab 98, the clutch collar 34 can be fitted onto the power tool 20. In some embodiments, the indicator 34 and the numbered scale 36 may also provide assistance in aligning the clutch collar 34 to provide proper assembly of the clutch collar 34 onto the nose cone 23.

FIG. 12 is a partial perspective view of the clutch collar 34 installed onto the guide 62. Other elements have been omitted from FIG. 12 in order to better show the interaction between the guide 62 and the clutch collar 34. The clutch collar 34, in some embodiments in accordance with the invention, is rotatable. The clutch collar 34 is rotatable on the power tool 20 in order to provide different torque and/or speed settings for the end effector 28. It may be desirable to limit the rotation of the clutch collar 34 in both directions to establish a maximum setting for turning the clutch collar clockwise and a maximum setting when turning the clutch collar counterclockwise as shown in FIG. 12. Making maximum and minimum settings is, in some embodiments, accomplished by using the collar stopping tab 82 which butts against the stop 110 on the clutch collar 34. The wall 112 on the stop 110 butts against a wall 114 on the collar stopping tab 82 to provide a limit to clutch collar 34 rotation in a clockwise direction as viewed in FIG. 12. The same stop 110 and collar stopping tab 82 provide a stop for rotating the clutch collar 34 in the opposite direction (i.e., counterclockwise as viewed in FIG. 12). This is accomplished when the clutch collar 34 is rotated so that the opposite wall 116 on the stop 110 butts against the opposite wall 118 on the tab 82.

FIG. 12 also illustrates additional notches 108 in the clutch collar 34 for providing detents when the clutch collar 34 is rotated to various settings with respect to the nose cone 23.

Figure 13:
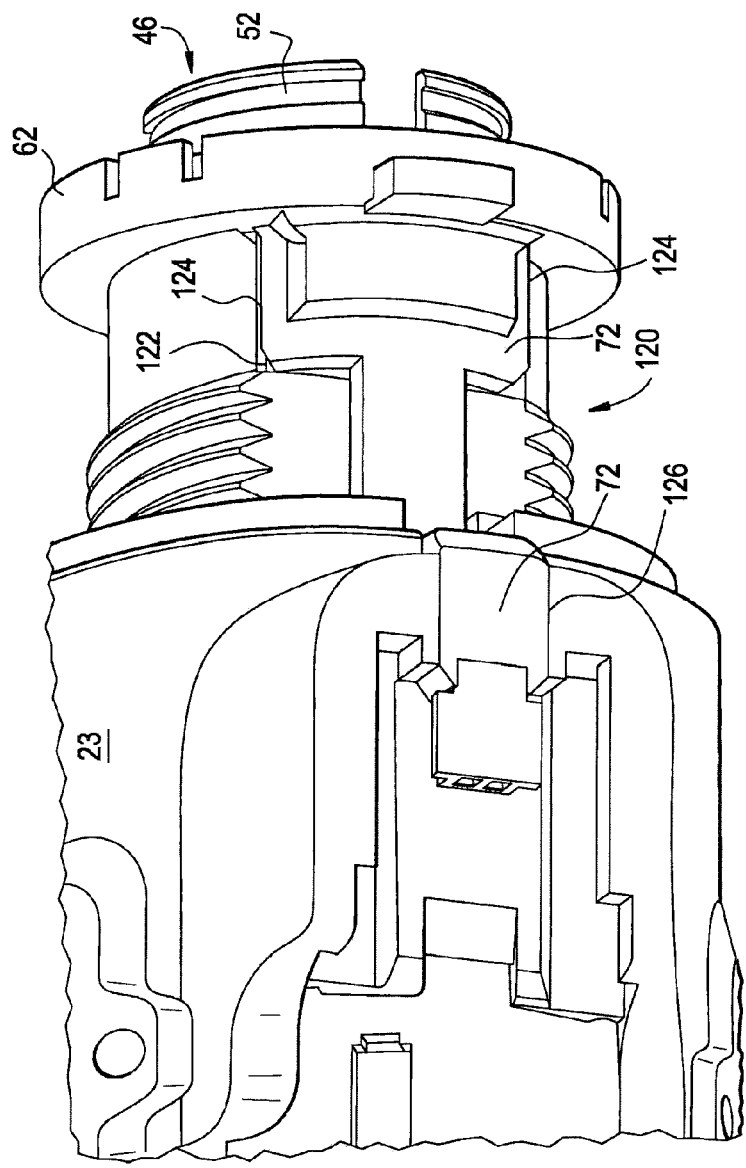
FIG. 13 is a partial perspective view of the wire guide mounted onto the nose cone.

FIG. 13 is a partial perspective view of the guide 62 mounted onto a stem portion 120 of the nose cone 23. A lock portion 124 of the guide 62 fits into a groove 122 of the stem portion 120 of the nose cone 23. The groove 122 is sized and dimensioned so that the lock portion 124 of the wire supporting portion 72 of the guide 62 fits within the groove 122 and locks the guide 62 to be angularly fixed with respect to the nose cone 23. The locks 124 located on the wire supporting portion 72 of the guide 62 are wider than the rest of the wire supporting portion 72 and aid in permitting the guide 62 to be securely seated in the groove 122 of the stem portion 120 of the nose cone 23.

A second groove 126 is in the nose cone 23 for allowing the wire supporting portion 72 of the guide 62 to fit within the groove 126 of the nose cone 23. The retainer 46 on the nose cone 23 and the groove 52 of the nose cone 23 are also shown forward of the guide 62. The above described features also help align the guide 62 with respect to the nose cone 23.

According to some embodiments, the retainer 46 is integral with the stem 120 and the nose cone 23. In other embodiments of the inventions, they may be separable parts.

Figure 14:
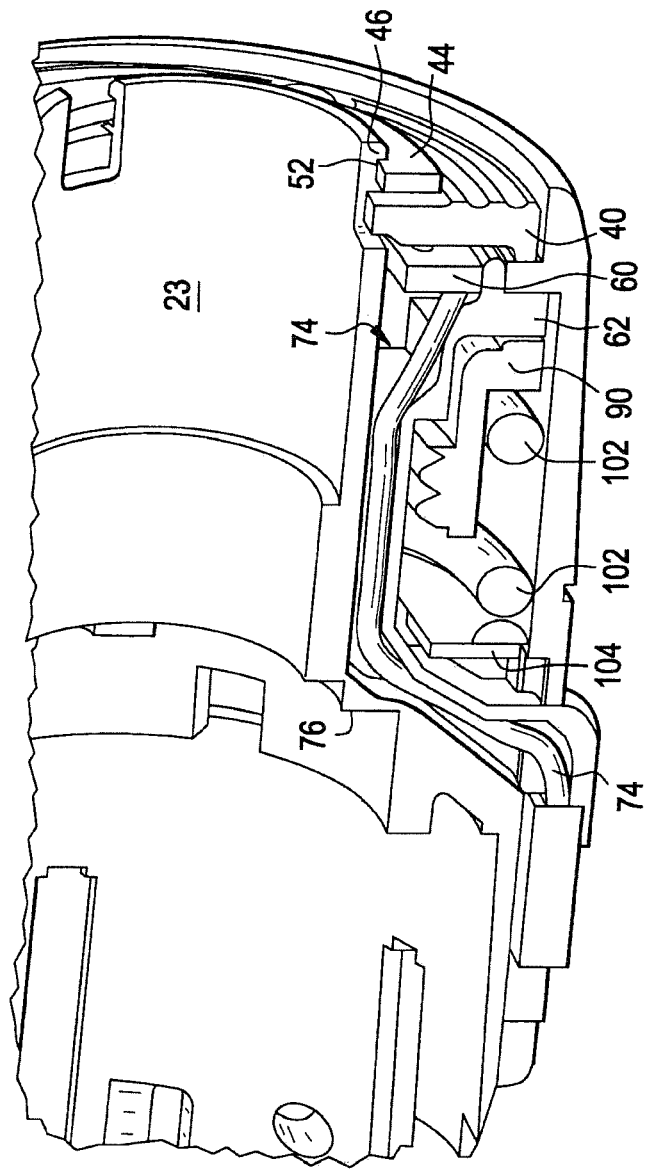
FIG. 14 is a partial cutaway perspective view of a nose cone as well as other elements mounted to the nose cone. The end effector and power transmission elements are removed for clarity.

FIG. 14 is a partial cutaway perspective view of the nose cone 23 and additional parts described below. FIG. 14 shows how the parts described herein are assembled together according to some embodiments of the invention. The transmission, spindle, and other parts associated with turning the end effector have been omitted to more clearly show the parts described herein. The retaining ring 44 is seated within the groove 52 of the retainer 46. The retaining ring 44 provides a limit of forward axial movement of the cover 40, the guide 62, and the clutch adjusting nut 90. The clutch spring 102 presses against the clutch washer 104 to urge the clutch adjusting nut 90 to urge the guide 62, PCB 60, and cover 40 against the retaining ring 44. The wires 76 are located in a channel 74 defined by the guide 62 and the nose cone 23. The wires 76 are protected from the spinning parts of the end effector mechanism.

Although an example of the light ring 38 is shown on a power driver 20, it will be appreciated that the light ring 38 can be used on other rotary power tools such as impact drivers, drills, hammer drills, routers.

Figure 15:
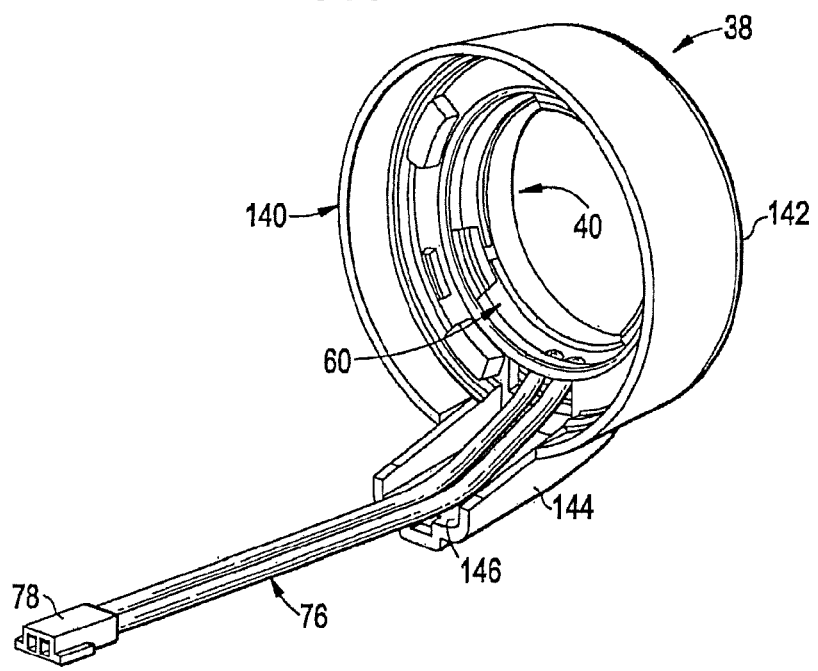
FIG. 15 is a perspective rear view of a holder in accordance with another embodiment of the invention.

An example embodiment in accordance with the invention where a light ring 38 is mounted on a different power tool than shown in the previous FIGS. is shown in FIGS. 15 through 19. FIG. 15 illustrates a perspective rear view of a holder 140 that is used on a power tool that is not equipped with a collar as described in the embodiments above. The holder 140 holds the light ring 38. The light ring 38 includes the PCB 60 similar to that described above. The PCB 60 and the holder 140 may include snap-in features 64 similar to that described above so that the PCB 60 snaps into and is secured in the holder 140.

A circular cover 40 may be mounted to the holder 140 in front of the PCB 60 similar to embodiments described above. The cover 40 may include snap-in elements that correspond with snap-in elements on the holder 140. In other embodiments in accordance with the invention, the lens 40 may be secured in place with a retaining ring system similar to that described above.

The holder 140 may attach to the nose cone 23 with snap-in elements located on both the holder 140 and the nose ring 23 similar to the snap-in features 64 described in the embodiments above. In other embodiments in accordance with the invention, the light ring holder 140 may be secured in place in a variety of ways including, but not limited to, a retaining ring system similar to the embodiments described above.

As shown in FIG. 15, the holder 140 includes a housing portion 142, a chin shroud 144, and a wire way portion 146. Wires 76 connect the PCB 60 (which contains light emitting elements similar to those described above) with a plug 78. In contrast to the wire way 62 described in the embodiments above, the holder 140 does not fully support the wires 76 along the full length of the wires 76 all the way to the plug 78. Rather, the wire way portion 146 stops at some point along the length of the wires 76, leaving the wires 76 and the plug 78 to be not supported by the holder 140.

Figure 16:
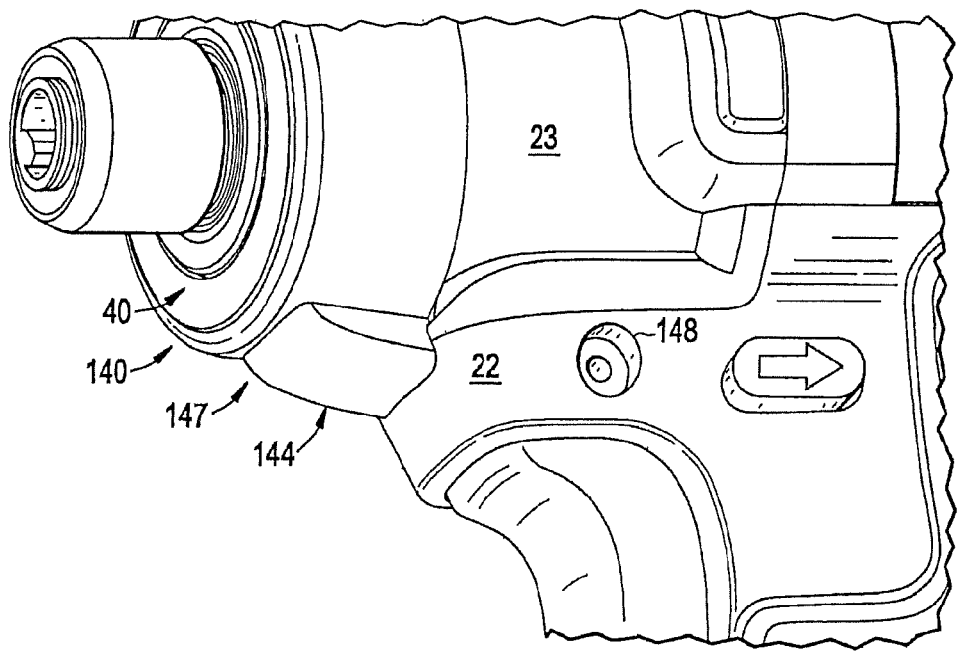
FIG. 16 is a partial perspective view of a power tool equipped with a holder similar to that shown in FIG. 15.

FIG. 16 is a partial perspective view of a power tool 147 that does not have a rotatable clutch collar but rather is equipped with the holder 140. The cover 40 is shown mounted in a recess in the holder 140. The holder 140 is mounted to the nose cone 23 which is supported by the housing 22. A fastener hole 148 is shown in the housing 22. The fastener hole 148 provides a place for a fastener such as a screw or bolt to connect the two halves of the clam shell type housing 22 together. While the fastener is not shown in FIG. 16, it will be appreciated that when the power tool 147 is fully constructed that a fastener will be located in the fastener hole 148 to connect the two halves of the clam shell housing 22 together. Other embodiments of the invention may connect the clamshells of the housing 22 in other ways. Some embodiments of the invention may include one piece housings or other types of housings than the clam shell housing shown in FIG. 16. The chin shroud 144 is located on the holder 140 and provides a housing for a portion of the wires 76 so that the wires 76 are not exposed outside of the power tool 147.

Figure 17:
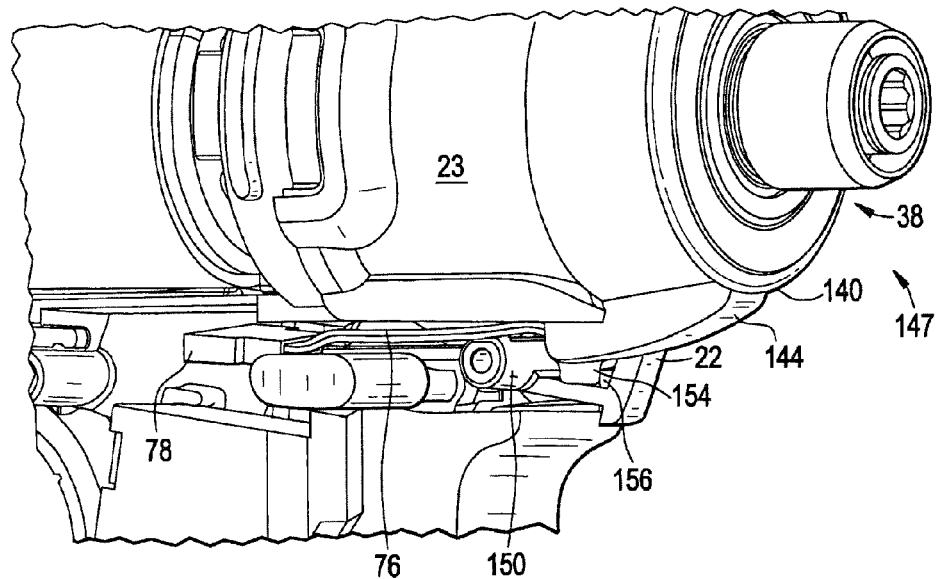
FIG. 17 is a partial perspective view with part of the housing removed of a power tool equipped with a holder similar to that shown in FIG. 15.
Figure 18:
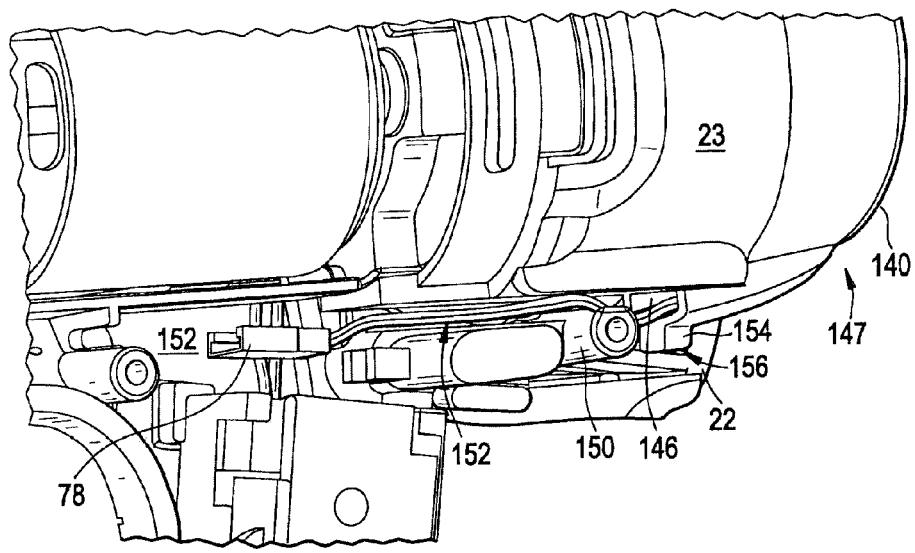
FIG. 18 is a partial perspective view of a power tool with part of the housing removed to expose interior components.

FIGS. 17 and 18 show the power tool 147 with part of the housing 22 removed. The housing 22 is a clam shell type housing and one of the clam shells is removed exposing the clam shell housing 22 located on the far side of the power tool 147. The holder 140 is shown mounted to the nose cone 23. A fastener hole tube 150 located in the fastener hole 148 is shown. The wires 76 are routed around the hole tube 150 and are located in the interior 152 of the housing 22. The wires 76 are terminated with a plug 78 also located in the interior 152 of the housing 22.

The interior 152 of the housing defines a space or pathway for the wires 76 and the plug 78. The chin shroud 144 defines a wire way portion 146 through which the wires 76 are strung. The chin shroud 144 also includes retaining structure 154 which is set in a retaining area 156 defined by the housing 22. When the two clam shells of the clam shell housing 22 are mounted together and fastened together with a fastener located in the fastener hole 148 and fastener hole tube 150, the retaining structure 154 on the chin shroud 144 is trapped in the retaining area 156 thereby holding the chin shroud 144 and holder 140 in place on the power tool 147. Operation of the light ring 38 is similar to that described in the embodiments above.

Figure 19:
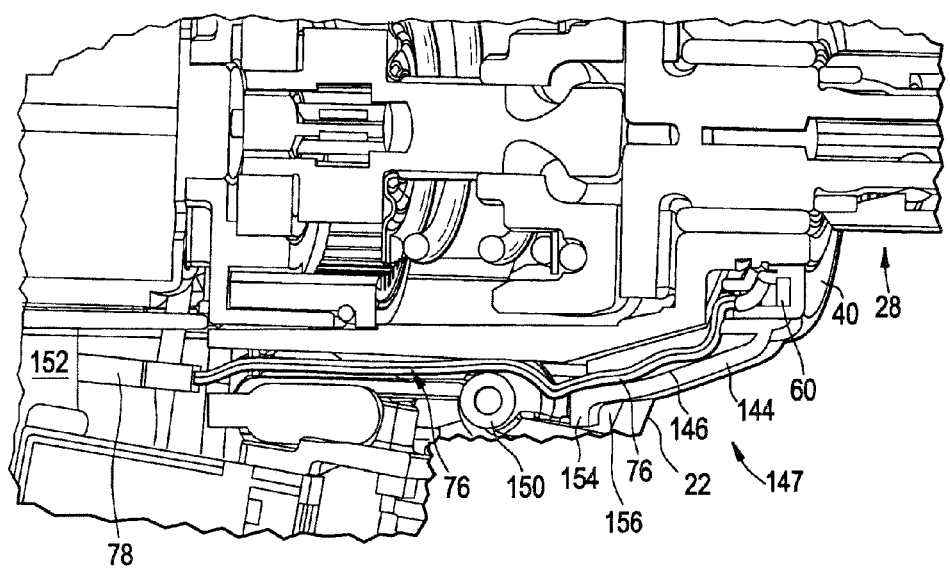
FIG. 19 is a partial perspective cut-away view of a power tool equipped with a holder similar to that shown in FIG. 15. The cut-away view illustrates some of the internal components of the power tool.

FIG. 19 is a partial perspective cut-away view showing the end effector 28 associated with the power tool 147 extending through the cover 40 located in front of the PCB 60. As described above, LEDs (not shown in FIG. 19) are located on the PCB 60 and configured to light the tool or workpiece being worked on by the power tool 147. The wires 76 provide power between the PCB 60 and a power source connected via the plug 78 to power source. The wires 76 are located in the wire way portion 146 of the chin shroud 144 and the interior 152 of the housing 22. The chin shroud 144 has the retaining structure 154 located in the retaining area 156 defined by the housing 22.

Figure 20:
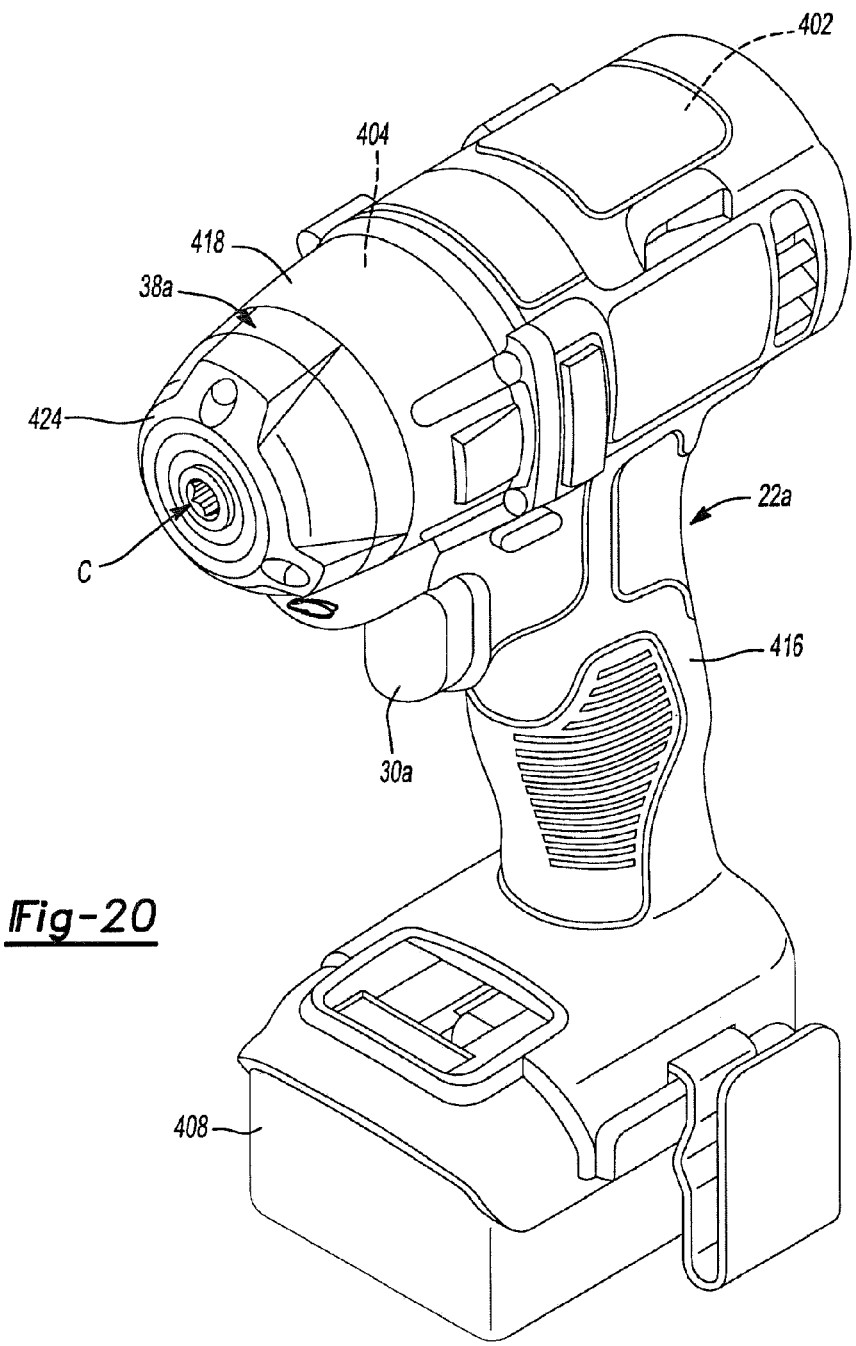
FIG. 20 is a perspective view of another power tool constructed in accordance with the teachings of the present disclosure.
Figure 21:
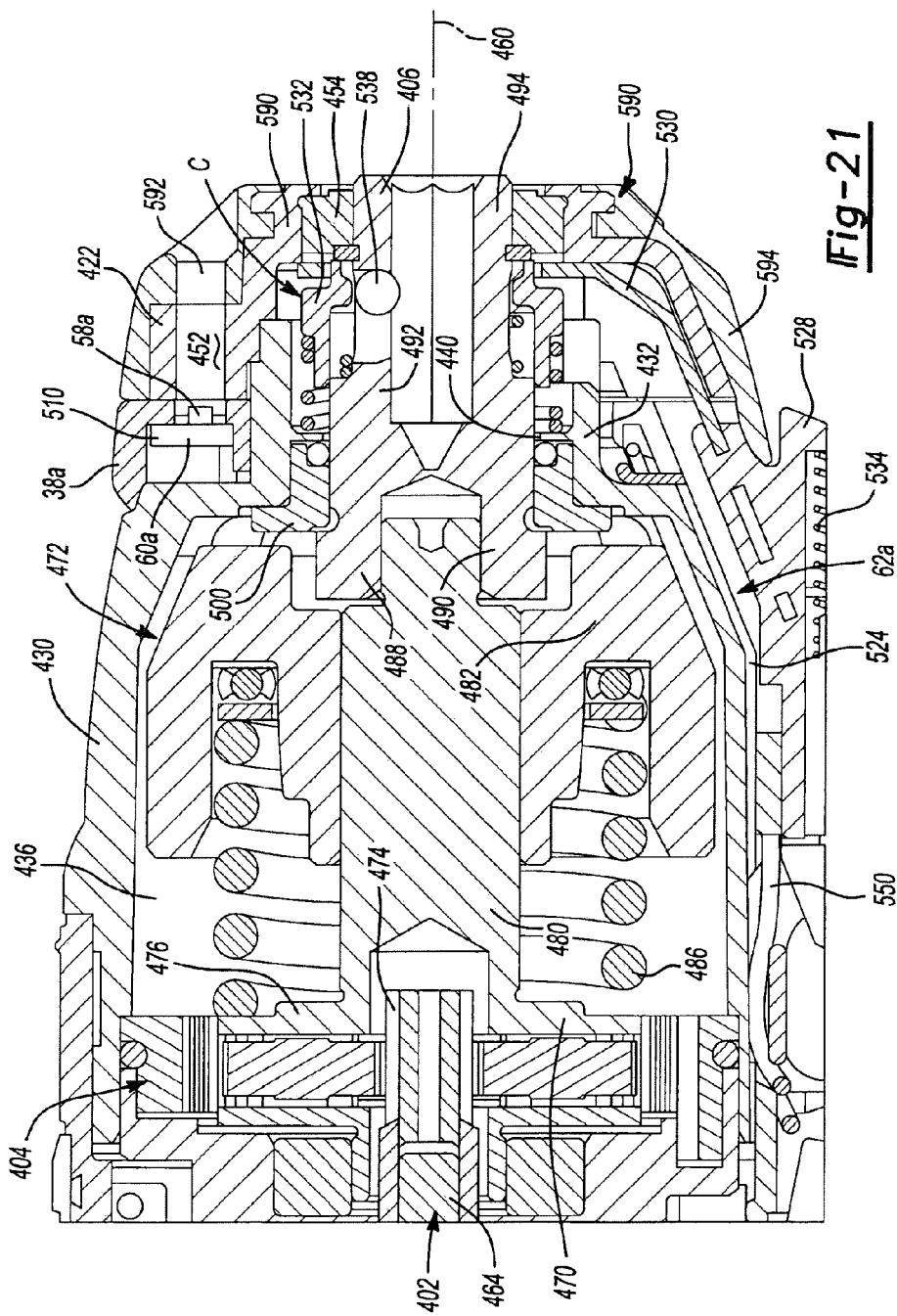
FIG. 21 is a longitudinal section view of a portion of the power tool of FIG. 20.
Figure 22:
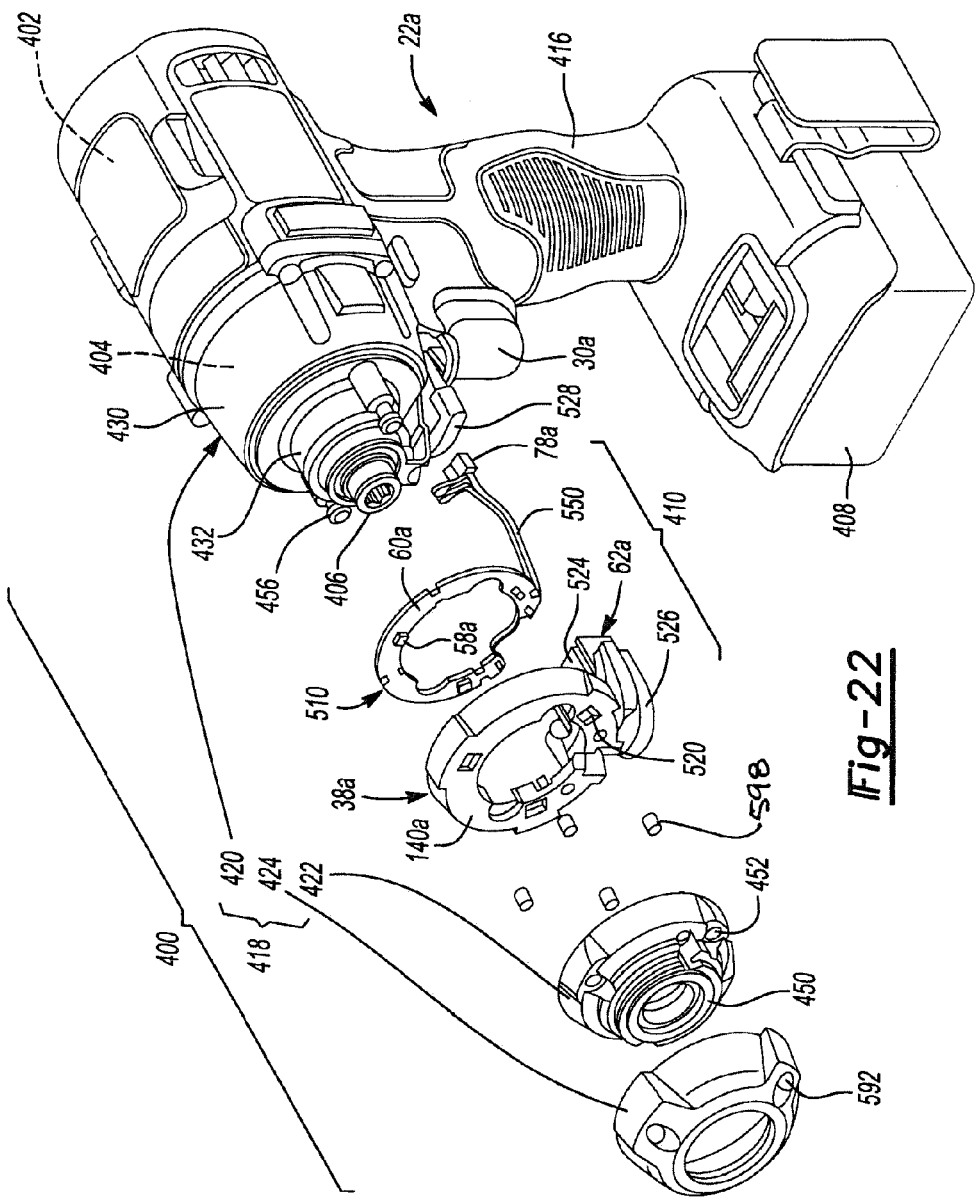
FIG. 22 is a partially exploded perspective view of the power tool of FIG. 20.

While the driver 20 (FIG. 1) has been illustrated and described herein as including a lighting system that is disposed between a gear case and a rotating collar 34 (FIG. 1) of the driver 20 (FIG. 1) and/or forwardly of a housing 22 (FIG. 1) and/or a gear case or nose cone 23 (FIG. 1), it will be appreciated that the driver could be constructed somewhat differently. With reference to FIGS. 20 through 22, for example, another driver constructed in accordance with the teachings of the present disclosure is generally indicated by reference numeral 400. The driver 400 can include a housing assembly 22a, a motor 402, a transmission 404, an output spindle 406, a battery pack 408 and a lighting system 410. In the particular example provided, the driver 400 is depicted as being an impact driver that operates the output spindle 406 in a rotary manner similar to that which is disclosed in U.S. application Ser. No. 12/769,981, the disclosure of which is incorporated by reference as if fully set forth in detail herein. Those of skill in the art will appreciate that the driver 400 could be configured as a screwdriver, drill driver, hammer drill driver, and/or rotary hammer to provide a rotary and/or axial output or could be configured to provide an axial output (e.g., hammer).

The housing assembly 22a can be configured to house the motor 402, the transmission 404 and at least a portion of the output spindle 406. In the example provided, the housing assembly 22a includes a clam shell housing 416, which is formed by a pair of clam shell halves, and a gear case assembly 418 that includes a first gear case member 420, a second gear case member 422, and a cover 424.

The first gear case member 420 can define a first case portion 430 and a second case portion 432. The first case portion 430 can be mounted to the clam shell housing 416 and extend forwardly therefrom. The first case portion 430 can define an internal cavity 436 into which the transmission 404 can be received. The second case portion 432 can be coupled to or integrally formed with the first case portion 430 and can extend forwardly therefrom. The second case portion 432 can define a spindle aperture 440 and a mounting boss 442. The spindle aperture 440 can intersect the internal cavity 436 to define a passageway through which the output spindle can be received.

The second gear case member 422 can define a bearing mount 450 and one or more through-holes 452. The bearing mount 450 can be configured to receive a spindle support bearing 454 therein. The second gear case member 422 can be received on the mounting boss 442 and can be secured thereto via a plurality of fasteners 456. It will be appreciated that the mounting boss 442 is configured to align the spindle support bearing 454 to the rotational axis 460 of the output spindle 406.

The motor 402, the battery pack 408 and the transmission 404 can be conventional in their construction and operation. Briefly, the motor 402 can be housed in the clam shell housing 416 and can be electrically coupled to the battery pack 408 through a trigger (switch) 30a. The battery pack 408 can be releasably coupled to the clam shell housing 416. The transmission 404 can be any type of transmission, such as a multistage planetary transmission, and can have an input member, that can be driven by an output shaft 464 of the motor 402, and an output member that can be drivingly coupled to the output spindle 406. In the particular example provided, the transmission 404 includes a single stage planetary reduction 470 and a Potts-type impact mechanism 472. A sun gear 474 associated with the planetary reduction 470 serves as the transmission input, while a planet carrier 476 associated with the planetary reduction serves as an output of the planetary reduction 470. The impact mechanism 472 can include an input spindle 480, which can receive rotary power from the planet carrier 476, a hammer 482, which can be mounted on the input spindle 480, a cam mechanism (not specifically shown), an impact spring 486 and an anvil 488. The cam mechanism can couple the hammer 482 to the input spindle 480 in a manner that permits limited rotational and axial movement of the hammer 482 relative to the input spindle 480. The impact spring 486 can bias the hammer 482 into a position where the cam mechanism rotatably couples the hammer 482 to the input spindle 480. The anvil 488, which can be mounted for rotation on the input spindle 480, is configured to engage the hammer 482 such that rotational energy in the hammer 482 can be transmitted to the anvil 488.

The output spindle 406 can be integrally formed with the anvil 488 and can have a shaft member 490, a chuck portion 492, and a journal portion 494 that can be disposed on a side of the chuck portion 492 opposite the shaft member 490. The shaft member 490 can be supported for rotation about the rotational axis 460 by a bushing 500 that is disposed in the first case portion 430 of the first gear case member 420. The chuck portion 492 can be disposed forwardly of the first gear case member 420 and can be configured to receive a tool bit, such as a ¼ inch hex bit, therein. The journal portion 494 can be a distal end of the output spindle 406 and can be received in the spindle support bearing 454 in the second gear case member 422 such that the end of the output spindle 406 opposite the input spindle 480 is journally supported by the second gear case member 422.

The lighting system 410 can include a light ring 38a and a circuit assembly 510.

The light ring 38a can comprise a holder 140a and a wireway 62a. The holder 140a can be formed in a generally semi-annular (e.g., horseshoe) shape that is configured to be mounted about a portion of the mechanism that unlatches the chuck or bit holder, as well as be matingly received on the mounting boss 442 of the first gear case member 420 such that the light ring 38a is rotationally fixed to the housing assembly 22a. The holder 140b can define a trench 61a, which can be configured to receive the circuit assembly 510, and a plurality of LED apertures 520 that can extend axially through the holder 140a in-line with the through-holes 452 in the second gear case member 422. The wireway 62a can define a wire channel 524, as well as an operator mount 526 that can be configured to receive there through an axially movable button 528 that can be employed to unlatch the bit holder C. The button 528 can be coupled to a lever 530, which is fitted to a bit holder sleeve 532, and can be biased outwardly from the clam shell housing 416 via a button spring 534. The bit holder sleeve 532 can be axially movably mounted on the chuck portion 492 of the output spindle 406 between a first or latched position, in which a locking ball 538 is urged radially inwardly into the hollow interior of the chuck portion 492, and a second or unlatched position in which the locking ball 538 may be moved radially outwardly so that a tool bit received in the chuck portion 492 can be withdrawn from the output spindle 406. The wireway 62a can effectively close an opening about the button 528 between the gear case assembly 418 and the clam shell housing 416.

The circuit assembly 510 can include a circuit board 60a, a plurality of LED's 58a and a wire harness 550. The circuit board 60a can be formed of an insulating material and can include wires or conductors (not specifically shown) that can electrically couple the wire harness 550 and the LED's 58a.

In the particular example provided, the circuit board 60a is a printed circuit board that is formed in a semi-annular shape that is configured to be received in the correspondingly shaped trench 61a formed in the light ring 38a. The LED's 58a can be fixedly coupled to the circuit board 60a and can be disposed in-line with the LED apertures 520 formed in the light ring 38a. If desired, the LED's 58a can extend into or through the LED apertures 520. The wire harness 550 can comprise a plurality of wires 76a and a plug 78a. The wires 76a can include first and second wires (not specifically shown) that can be coupled to the conductors of the circuit board 60a and to the conductors (not specifically shown) in the plug 78a to transmit electrical power between the plug 78a and the LED's 58a. The wires 76a can be received in the wireway 62a in the light ring 38a and can be festooned or routed through a wire channel 524 formed in the clam shell housing 416. The plug 78a can be configured to matingly engage a corresponding plug (not specifically shown) to electrically couple the circuit assembly 510 to a source of electrical power. In the particular example provided, the corresponding plug is electrically coupled to a trigger 30a that is coupled to the battery pack 408. The trigger 30a can be configured to transmit electrical power from the battery pack 408 to the circuit assembly 510 in a desired manner, such as during operation of the motor 402, or during operation of the motor 402, as well as for a predetermined amount of time after operation of the motor 402.

Figure 23:
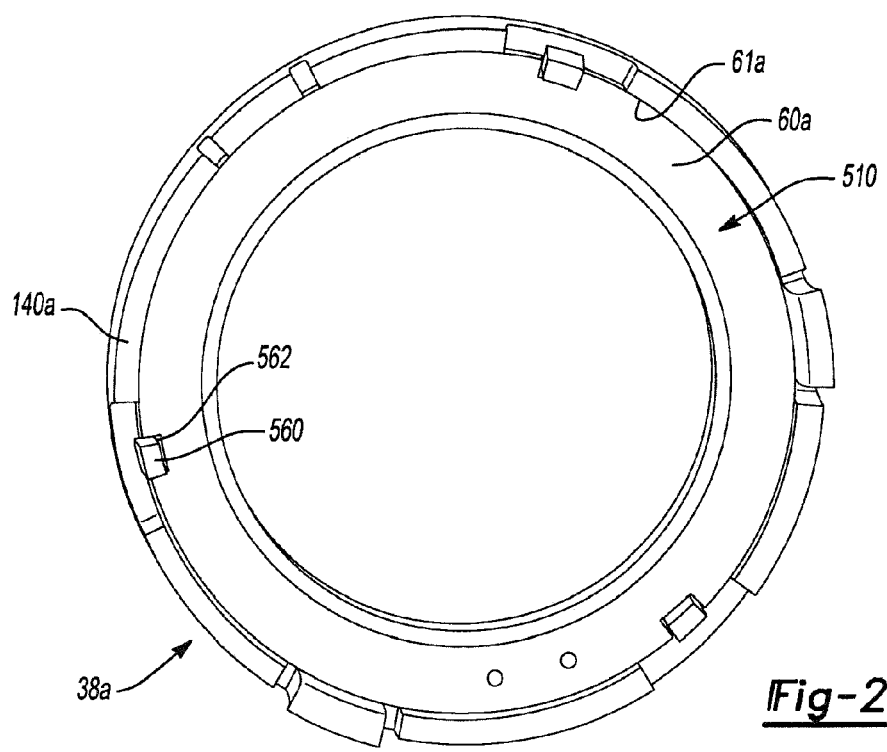
FIG. 23 is a rear elevation view of a portion of the power tool of FIG. 20, illustrating a portion of a light ring in more detail prior to the deformation of a plurality of tabs on a holder.
Figure 24:
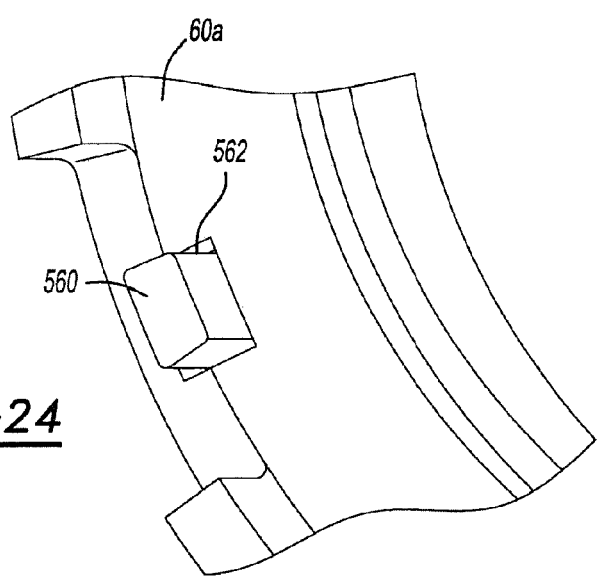
FIG. 24 is an enlarged perspective view of a portion of the light ring illustrated in FIG. 23.
Figure 25:
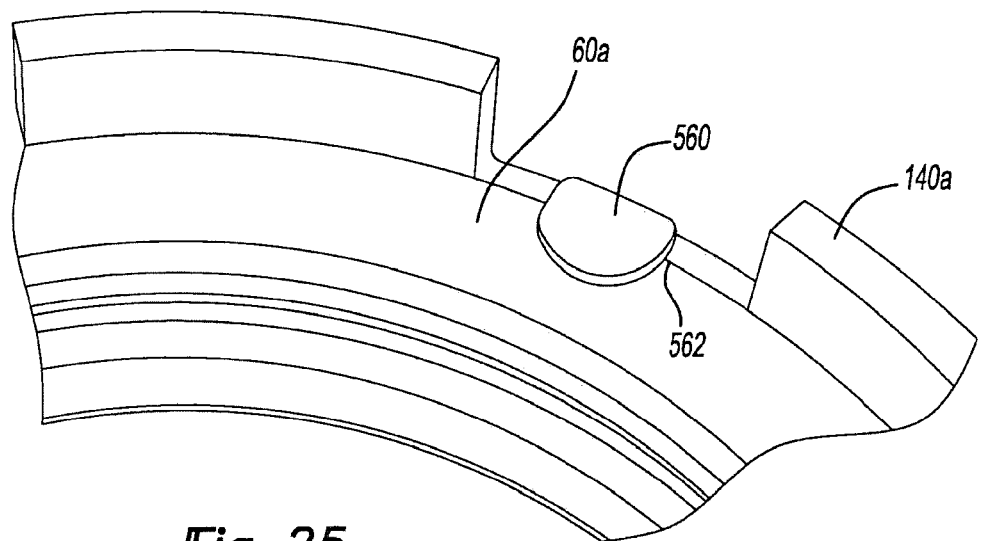
FIG. 25 is an enlarged perspective view of a portion of the light ring shown after the plurality of tabs on the holder have been deformed to retain a circuit board to the holder.

The circuit assembly 510 can be coupled to the light ring 38a in any desired manner, including adhesives, potting compounds, clips and fasteners. In the particular example provided, the light ring 38a comprises a plurality of retaining tabs 560 that can extend through tab apertures 562 in the circuit board 60a. With additional reference to FIGS. 23 and 24, the tabs 560 can be initially formed to extend in an axial direction that is generally parallel to the rotational axis 460 of the output spindle 406, which can facilitate the axial translation of the circuit board 60a into the trench 61a, and can be deformed in whole or in part to retain the circuit board 60a within the trench 61a. The tabs 560 can be deformed by twisting or bending, but in the example provided, each of the tabs 560 is heated and bent over at a right angle as shown in FIG. 25 so as to lie over a portion of the circuit board 60a adjacent a corresponding one of the tab apertures 562.

Figure 26:
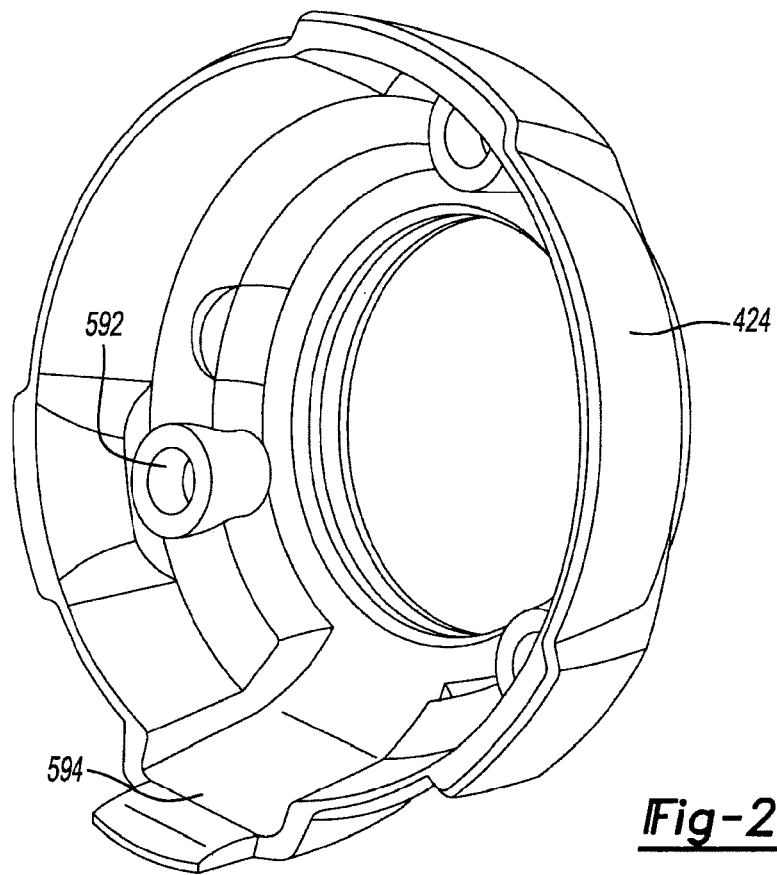
FIG. 26 is a perspective view of a portion of the power tool of FIG. 20, illustrating a cover associated with a gear case.

With renewed reference to FIGS. 20 through 22 and additional reference to FIG. 26, the cover 424 can be fixedly coupled to the second gear case member 422 in any desired manner, such as via mating sets of ribs and grooves 590. It will be appreciated that mating features (not specifically shown) may be formed into the cover 424 and the second gear case member 422 that inhibit rotation of the cover 424 relative to the second gear case member 422 when the cover 424 is engaged to the second gear case member 422. The cover 424 can define a set of second through-holes 592, as well as a button stop 594. The set of second through-holes 592 can be disposed in-line with the through-holes 452 in the second gear case member 422 and the LED's 58a in the circuit assembly 510 such that light generated by the LED's 58a can be transmitted through the second gear case member 422 and the cover 424 to illuminate an area forwardly of the gear case assembly 418 and the output spindle 406. The button stop 594 can be disposed forwardly of the button 528 and can be employed to limit forward axial movement of the button 528.

It will be appreciated that if desired, various devices (not shown), such as lenses and/or diffusers, may be incorporated into the driver 400. For example, such devices may be located in one or both of the through-holes 452 in the second gear case member 422 and the second through-holes 592 in the cover 424.

If desired, one or more resilient elements may be disposed between the light ring 38a and the gear case assembly 418 to generate or limit an axially directed clamping force that is exerted onto the light ring 38a. In the particular example provided, four resilient dampers 598 are mounted to second gear case member 422 and abut the front axial face of the light ring 38a. The resilient dampers 598 are compressed when the second gear case member 422 is fastened to the first gear case member 420 to thereby apply a clamping force to the light ring 38a that inhibits movement of the light ring 38a relative to the gear case assembly 418.

Figures 27, 28:
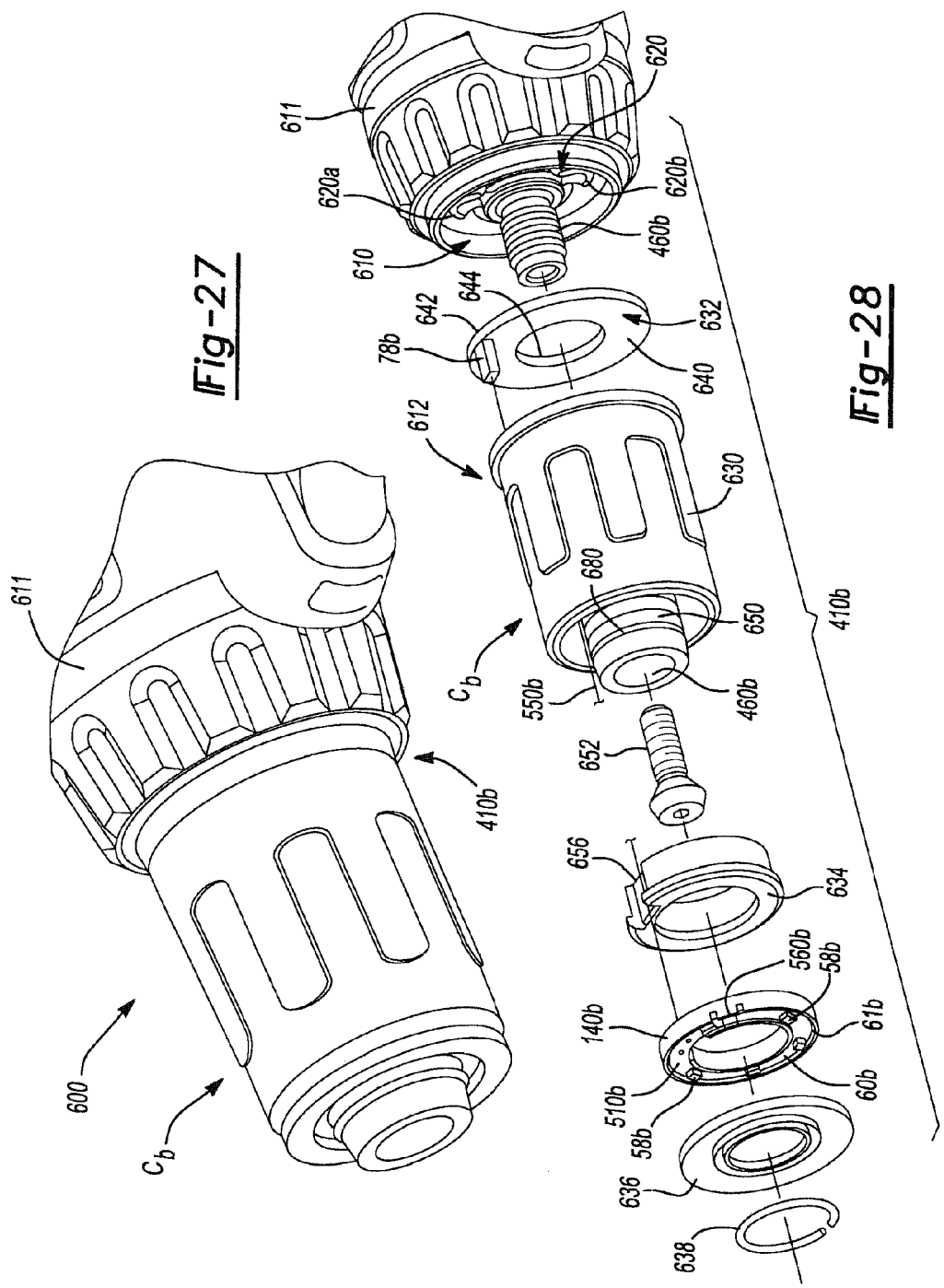
FIG. 27 is a perspective view of a portion of another power tool constructed in accordance with the teachings of the present disclosure.
FIG. 28 is an exploded perspective view of a portion of the power tool of FIG. 27.
Figure 29:
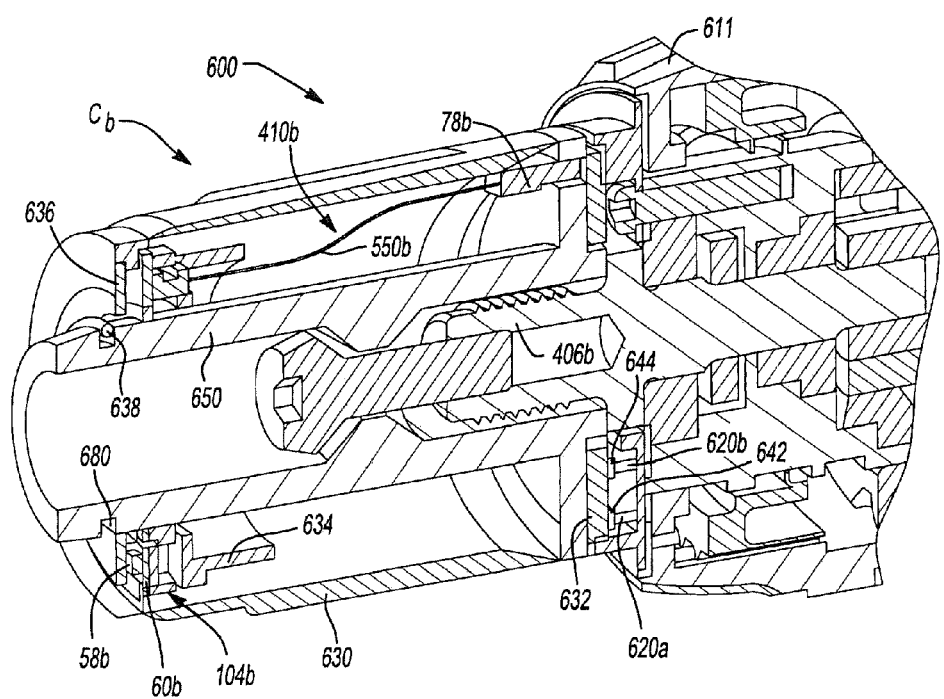
FIG. 29 is a longitudinal cross-sectional view of a portion of the power tool of FIG. 27.

With reference to FIGS. 27 through 29, another driver constructed in accordance with the teachings of the present disclosure is generally indicated by reference numeral 600. The driver 600 can be a drill/driver of the type that is disclosed in U.S. patent application Ser. No. 12/610,762 (the disclosure of which is incorporated as if fully set forth in detail herein), except that a lighting system is incorporated into the driver 600. In the example provided, the lighting system 410b includes a first portion 610, which can be mounted to an output spindle assembly 611, and a second portion 612 that can be coupled for rotation with a drill chuck Cb.

The first portion 610 can comprise a set of spring contacts 620 that can be electrically coupled to a source of electrical power (e.g., to a battery pack via a trigger switch). The spring contacts 620 can comprise a first spring contact 620a and a second spring contact 620b that can be electrically isolated from one another. The first spring contact 620a can be offset in a radial direction by a first distance from a rotational axis 460b of the output spindle 406b, while the second spring contact 620b can be offset in a radial direction by a second distance that is different from the first distance.

The second portion 612 can comprise a sleeve 630, a coupler 632, a bushing 634, a holder 140b, a circuit assembly 510b, a cover 636 and a retaining ring 638. The sleeve 630 can be received about the chuck Cb and can be configured to receive a rotary input from an operator to open or close the jaws (not shown) of the chuck Cb. It will be appreciated that the chuck Cb can be any type of chuck Cb, such as a keyless chuck.

The coupler 632 can include an annular plate 640, first and second conductor tracks 642 and 644, respectively, and a plug 78b. The annular plate 640 can be formed of an electrically insulating material, such as a durable relatively non-conductive plastic (i.e., a plastic that is electrically insulating when an electrical potential that is less than 50 or 100 volts is applied to it). The annular plate 640 can be fixedly mounted on the spindle 650 of the chuck Cb. The spindle 650 of the chuck Cb can be engaged to the output spindle 406b by any desired means. In the particular example provided, the spindle 650 of the chuck Cb is threaded onto the output spindle 406b via left-handed threads and a spindle retaining fastener 652 is fitted through the spindle 650 and threadably engaged to the output spindle 406b. Accordingly, it will be appreciated that as the spindle 650 of the chuck Cb is coupled for rotation with the output spindle 406b, the annular plate 640 will also rotate with the output spindle 406b by virtue of its connection to the spindle 650 of the chuck Cb. The first and second conductor tracks 642 and 644 can be mounted to a first side of the annular plate 640 and can be disposed concentrically such that they are electrically isolated from one another. The first and second conductor tracks 642 and 644 can be configured to electrically engage the first and second spring contacts 620a and 620b, respectively. The plug 78a can be fixedly coupled to a second side of the annular plate 640 and can comprise terminals (not specifically shown) that can be electrically coupled to the first and second conductor tracks 642 and 644. In the particular example provided, the terminals extend through the annular plate 640 so as to intersect respective portions of the first and second conductor tracks 642 and 644 and solder is employed to electrically couple the terminals and the first and second conductor tracks 642 and 644.

The bushing 634 can be received between the spindle 650 of the chuck Cb and the sleeve 630 on a side of the chuck Cb opposite the annular plate 640. A slot or groove 656 can be formed in the bushing 634.

The holder 140b can be an annular structure that can define an annular trench 61b.

The circuit assembly 510b can include a circuit board 60b, a plurality of LED's 58b and a wire harness 550b. The circuit board 60b can be formed of an insulating material and can include wires or conductors (not specifically shown) that can electrically couple the wire harness 550b and the LED's 58b. In the particular example provided, the circuit board 60b is a printed circuit board that is formed in an annular shape that is configured to be received in the correspondingly shaped trench 61b formed in the holder 140b. The LED's 58b can be fixedly coupled to the circuit board 60b on a side opposite the holder 140b. The wire harness 550b can comprise a plurality of wires 76b including first and second wires (not specifically shown) that can be coupled to the conductors of the circuit board 60b and to the conductors (not specifically shown) in the plug 78b to transmit electrical power between the plug 78b and the LED's 58b. The wires 76b can be received in the radial space between the spindle 650 of the chuck Cb and the sleeve 630 and can extend longitudinally through the groove 656 in the bushing 634.

The circuit assembly 510b can be coupled to the holder 140b in any desired manner, including adhesives, potting compounds, clips and fasteners. In the particular example provided, the holder 140b comprises a plurality of retaining tabs 560b that can extend through tab apertures (not specifically shown) in the circuit board 60b. The tabs 560b can be initially formed to extend in an axial direction that is generally parallel to the rotational axis 460b of the spindle 650 of the chuck Cb, which can facilitate the axial translation of the circuit board 60b into the trench 61b, and can be deformed in whole or in part to retain the circuit board 60b within the trench 61b. The tabs 560b can be deformed by twisting or bending, but in the example provided, each of the tabs 560b is heated and bent over at a right angle so as to lie over a portion of the circuit board 60b adjacent a corresponding one of the tab apertures.

The cover 636 can be an annular structure that can be fitted to an axial end of the sleeve 630 opposite the coupler 632 and can aid in axially fixing the holder 140b in place in the sleeve 630 against a front face of the bushing 634. The cover 636 can be formed of a transparent material that can be clear or colored. The transparent material can be formed such that light received from the LED's 58b will exit the cover 636 in a desired manner. For example, the light exiting the cover 636 can be spread or concentrated over a desired area to illuminate one or more relatively large areas and/or one or more relatively small points.

The retaining ring 638 can be received in a ring groove 680 in the spindle 650 of the chuck Cb and can be configured to limit forward motion of the cover 636 relative to the sleeve 630 to thereby maintain the cover 636 on the spindle 650 of the chuck Cb.

Figure 30:
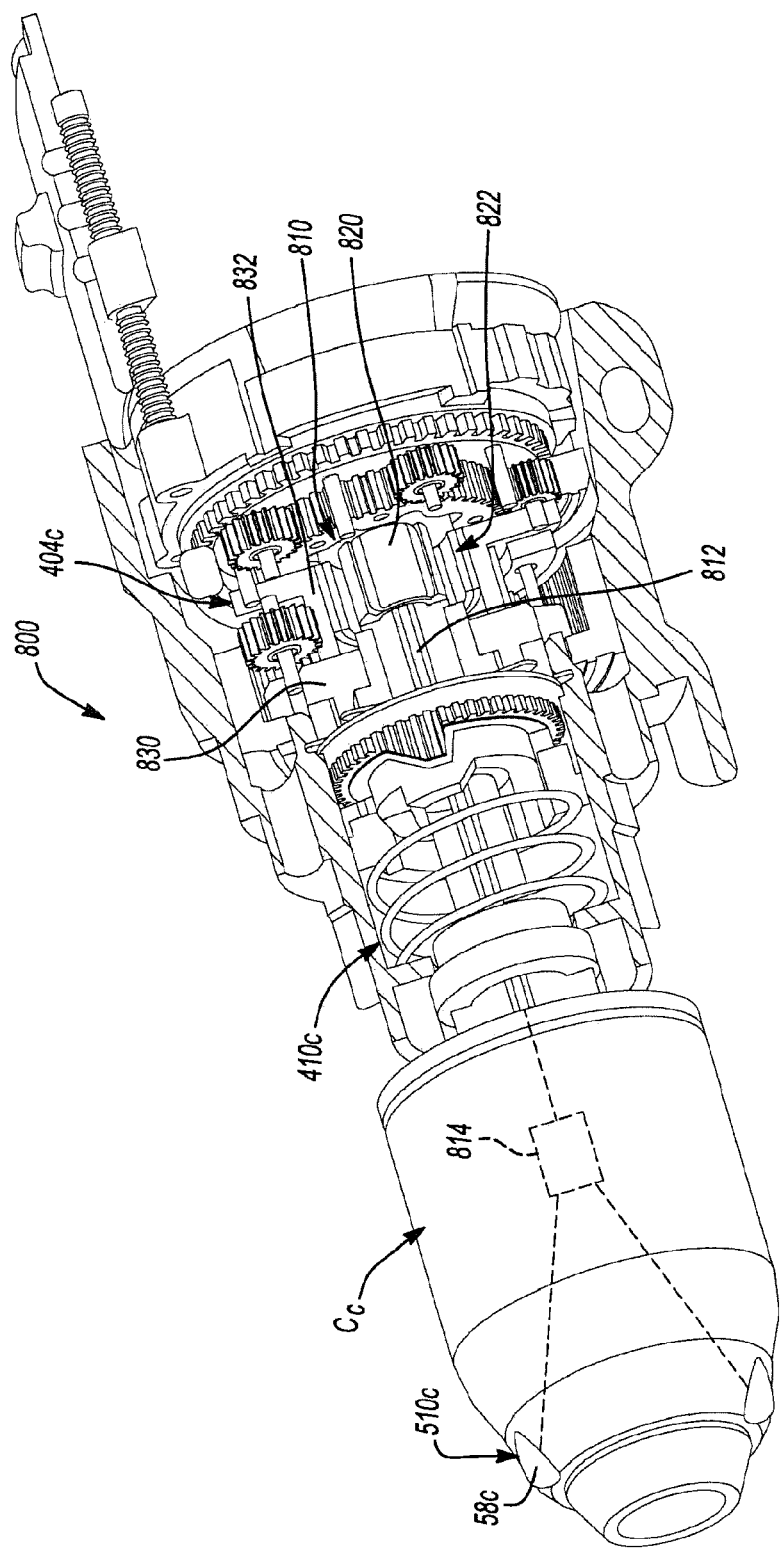
FIG. 30 is a perspective, partially sectioned view of a portion of yet another power tool constructed in accordance with the teachings of the present disclosure.
Figure 31:
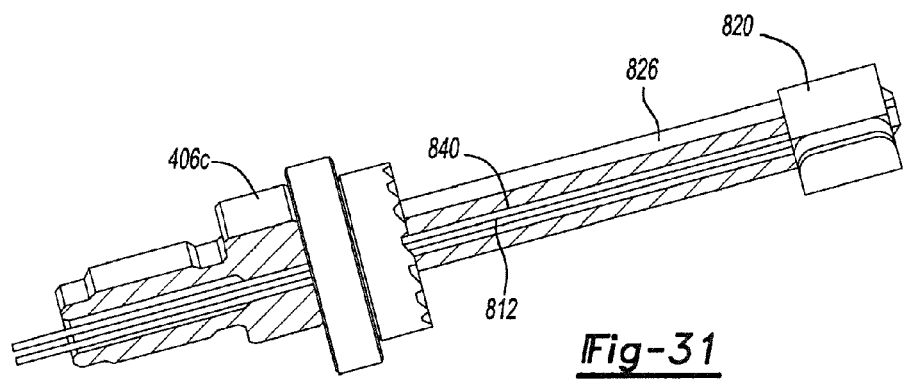
FIG. 31 is a perspective, partially sectioned view of a portion of the power tool of FIG. 30, illustrating an output spindle and a field winding in more detail.
Figure 32:
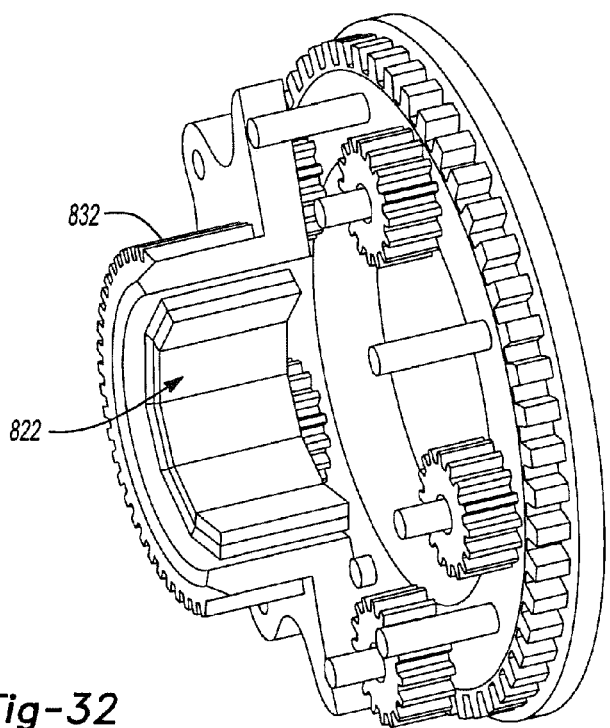
FIG. 32 is a perspective, partially sectioned view of a portion of the power tool of FIG. 30, illustrating a sun gear and a set of magnets in more detail.

With reference to FIGS. 30 through 32, another driver constructed in accordance with the teachings of the present disclosure is generally indicated by reference numeral 800. The driver 800 can be a drill driver of the type that is disclosed in U.S. patent application Ser. No. 12/610,762, except that a lighting system is incorporated into the tool. In the example provided, the lighting system 410c includes a generator 810, a conductive connector 812, an energy storage device 814 and a circuit assembly 510c.

The generator 810 can comprise one or more field windings 820 and one or more sets of magnets 822. The field winding(s) 820 can be mounted on a generator shaft portion 826 of the output spindle 406c of the driver 800. As will be appreciated from the aforementioned '762 patent application, the output spindle 406c can be coupled (e.g., via a spindle lock) to an output member of an output stage 830 of a multi-stage planetary transmission 404c. The generator shaft portion 826 of the output spindle 406c in this example can extend rearwardly of the output stage 830 to orient each field winding 820 with a component within the transmission 404c or driven by the transmission 404c that is configured to rotate at a speed that is higher than the rotational speed at which the output spindle 406c is driven. In the example provided, the generator shaft portion 826 extends rearwardly into a sun gear 832 that provides a rotary input to the output stage 830 of the transmission 404c. Each set of magnets 822 can be mounted to a rotating element of the transmission 404c (or an element rotated by the transmission 404c) and can be arranged concentrically about an associated field winding 820. In the particular example provided, the set of magnets 822 is fixedly coupled to the sun gear 832 of the output stage 830 of the transmission 404c. It will be appreciated that during operation of the driver 800, each set of magnets 822 will rotate at a speed that is higher than the rotational speed of its associated field winding 820 and that as a result of the speed differential, an electric current will be induced in the field winding(s) 820. Stated another way, each set of magnets 822 and its associated field winding 820 comprise a generator that generates an electric current when rotary power is input to the transmission 404c during operation of the driver 800.

The conductive connector 812 can be configured to electrically couple the generator 810 to the energy storage device 814 and/or to the circuit assembly 510c. In the example provided, the output spindle 406c has a hollow longitudinally-extending cavity 840 into which the conductive connector 812 is received. The conductive connector 812 can comprise a pair of wires that can be received through the cavity 840 such that the conductive connector 812 is mounted coaxially within the output spindle 406c.

The energy storage device 814 can be electrically coupled the generator 810 and the circuit assembly 510c in any desired manner and can be any type of energy storage device, including a rechargeable battery. In the particular example provided, the energy storage device 814 is a capacitor that is mounted in a chuck Cc that is coupled to the output spindle 406c for rotation therewith. It will be appreciated, however, that the energy storage device 814 could be mounted within the output spindle 406c in the alternative.

The circuit assembly 510c can be electrically coupled to the generator 810 and/or to the energy storage device 814 (e.g., via the conductive connector 812) and can be mounted within the chuck Cc. The circuit assembly 510c can comprise one or more LED's 58c that can be driven by the electrical energy generated by the generator 810.

Figure 33:
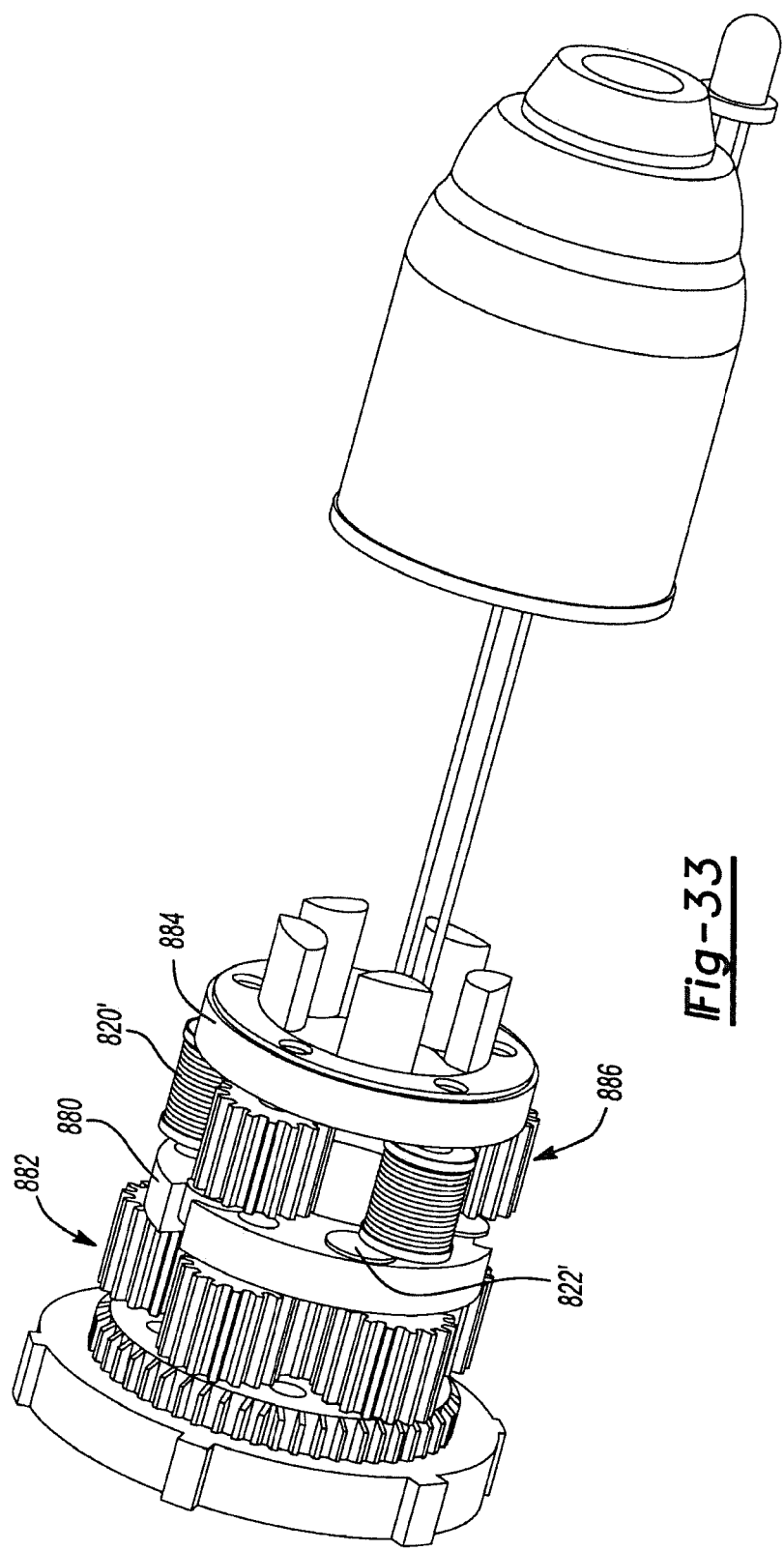
FIG. 33 is a perspective view of a portion of another power tool constructed in accordance with the teachings of the present disclosure.

While the generator 810 has been illustrated and described as including one or more field windings that mounted on an output spindle of a tool, it will be appreciated that the generator could be constructed somewhat differently. For example, the set of magnets 822' can be mounted to a planet carrier 880 of a first planetary stage 882 while the field windings 820' can be mounted to a planet carrier 884 of a second planetary stage 886 as shown in FIG. 33 such that the set of magnets 822' rotate at a rotational speed that is higher than a rotational speed at which the field windings 820' rotate.

Figure 34:
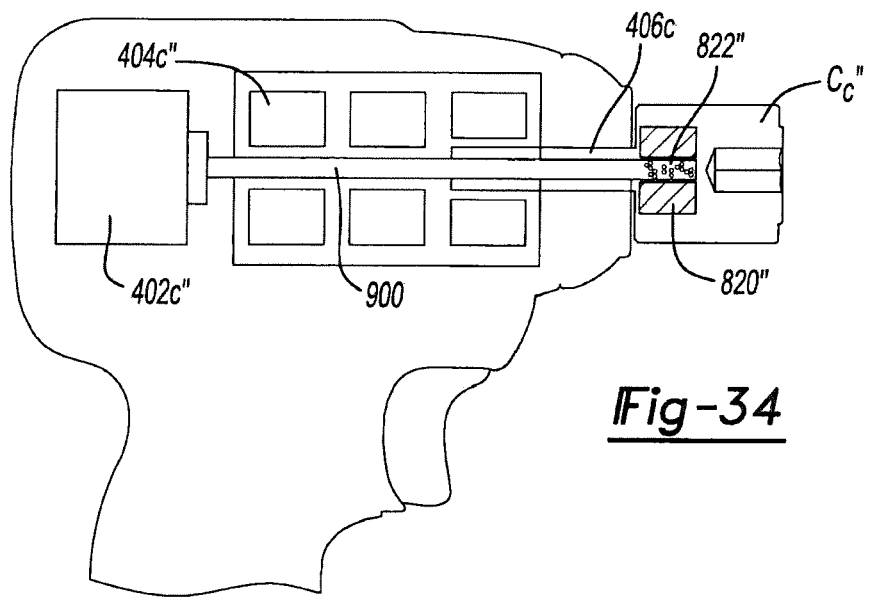
FIG. 34 is a schematic illustration of another power tool constructed in accordance with the teachings of the present disclosure.
Figure 35:
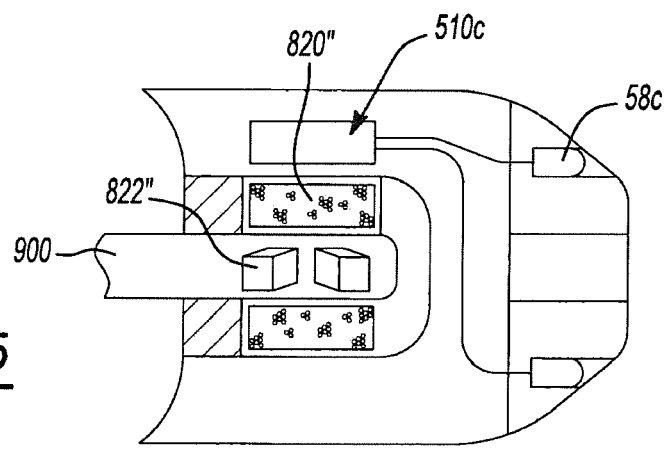
FIG. 35 is an enlarged portion of FIG. 34, illustrating the set of magnets and the field winding positioned within the chuck.
Figure 36:
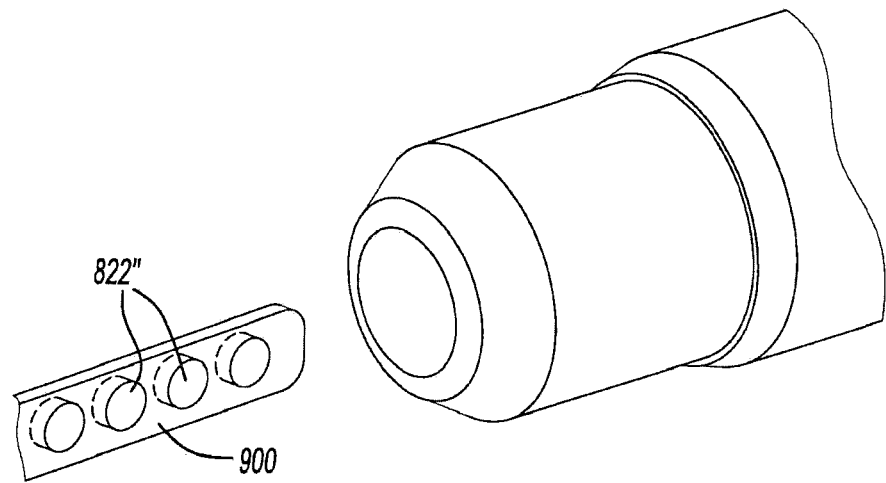
FIG. 36 is a schematic illustration of an alternative manner of mounting the set of magnets to the drive shaft.
Figure 37:
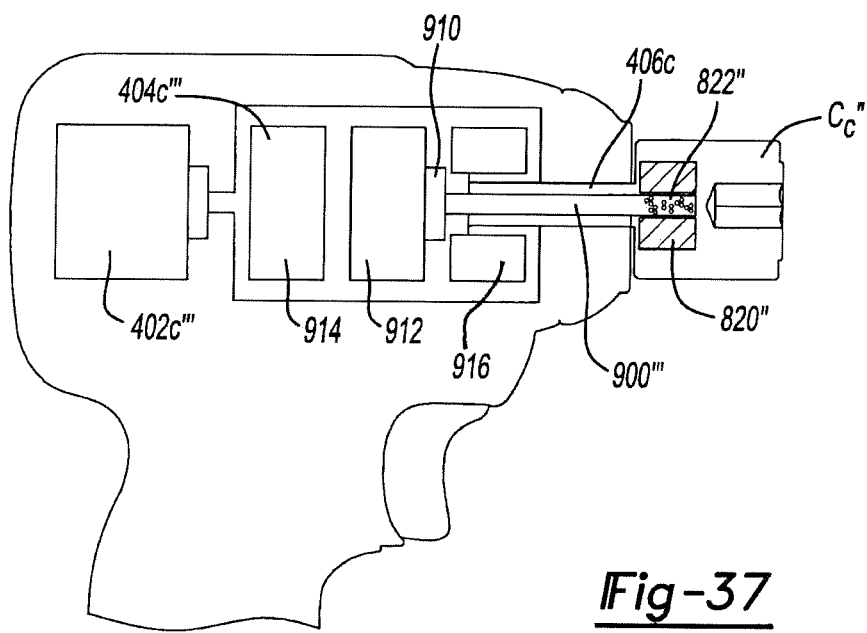
FIG. 37 is a schematic illustration of another power tool constructed in accordance with the teachings of the present disclosure.

In the examples of FIGS. 34 through 37, the set of magnets is received within the field winding. In FIGS. 34 and 35, the set of magnets 822" is mounted on a drive shaft 900 that receives rotary power directly from a motor 402c" that drives the transmission 404c". The drive shaft 900 extends through the transmission 404c" and into the chuck Cc" such that a distal end of the drive shaft 900 is mounted coaxially within the field winding 820" that is also housed in the chuck Cc". The set of magnets 822" can be mounted to the distal end of the drive shaft 900. With reference to FIGS. 35 and 36, the set of magnets 822" can comprise two or magnets that can be spaced apart axially along a portion of the distal end of the drive shaft 900. In FIG. 37, the drive shaft 900'" is mounted to a component within the transmission 404c'" or that is driven by the transmission 404c'" so as to permit the drive shaft 900'" to rotate at a speed that is higher than the rotational speed of the output spindle 406c. In the example illustrated, the drive shaft 900'" is coupled for rotation with a planet carrier 910 associated with a second stage 912 of the transmission 404c'" that is intermediate input and output stages 914 and 916 of the transmission 404c'".

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power tool comprising:
   a housing
   a motor received in the housing and coupled to a source of electrical power;
   an output spindle extending from the housing;
   a chuck external to the housing and coupled to the output spindle for rotational movement therewith;
   a transmission configured to transmit rotational motion from the motor to the output spindle and to the chuck;
   a light unit coupled to the chuck for rotational motion with the chuck;
   a first electrical conductor connected to the source of electrical power and received in the housing;
   a second electrical conductor connected to the light unit and received in the chuck,
   wherein the first electrical conductor transmits power to the second electrical conductor to transmit power from the source of electrical power to the light unit.

2. The power tool of claim 1, wherein the first electrical conductor remains substantially stationary in the housing.

3. The power tool of claim 2, wherein the second electrical conductor rotates together with the chuck.

4. The power tool of claim 1 wherein the first conductor includes an electrically conductive contact, and the second conductor includes an electrically conductive track, such that the contact engages the track as the chuck rotates relative to the housing.

5. The power tool of claim 1, wherein the first conductor comprises at least one field winding.

6. The power tool of claim 1, wherein the first conductor further comprises at least one magnet, wherein the at least one field winding and the at least one magnet together comprise a generator of electrical power.

7. The power tool of claim 5, wherein the second conductor comprises at least one energy storage device.

8. The power tool of claim 1, wherein the second conductor comprises at least one field winding.

9. The power tool of claim 8, wherein the second conductor further comprises at least one magnet, wherein the at least one field winding and the at least one magnet together comprise a generator of electrical power.

10. The power tool of claim 1, wherein the light unit is mounted on a sleeve coupled to the chuck for rotation together with the chuck.

11. The power tool of claim 1, wherein the light unit comprises at least one lighting element received in the chuck.

12. The power tool of claim 11, wherein the light unit further comprises a printed circuit board, and the at least one lighting element comprises at least one LED mounted on the printed circuit board.

13. The power tool of claim 12, wherein the light unit further comprises a clear cover over the at least one LED.

14. A chuck for a power tool comprising:
a chuck body adapted to be non-rotationally attached to an output spindle of a power tool so that rotation of the output spindle causes rotation of the chuck body;
at least one field winding in the chuck body, the at least one field winding adapted to transmit electrical current;
a light unit coupled to the chuck body and adapted to illuminate an area in front of the chuck; and
a light unit circuit electrically connecting the at least one field winding to the light unit to transmit electrical current to the light unit.

15. The chuck of claim 14, further comprising at least one magnet received in the chuck body, wherein the at least one field winding and the at least one magnet together comprise a generator of electrical power.

16. The chuck of claim 14, wherein the light unit circuit comprises an electrical energy storage device.

17. The chuck of claim 16, wherein the energy storage device comprises a capacitor.

18. The chuck of claim 14, wherein the light unit is mounted on a sleeve coupled to the chuck for rotation together with the chuck.

19. The chuck of claim 14, wherein the light unit comprises a printed circuit board and at least one LED mounted on the printed circuit board.

20. The chuck of claim 19, wherein the light unit further comprises a clear cover over the at least one LED.

* * * * *